(12) United States Patent
Morimoto

(10) Patent No.: US 12,498,893 B2
(45) Date of Patent: Dec. 16, 2025

(54) INFORMATION PROCESSING APPARATUS TO EXTEND PRINT FUNCTION AND NON-TRANSITORY COMPUTER-READABLE STORAGE MEDIUM

(71) Applicant: CANON KABUSHIKI KAISHA, Tokyo (JP)

(72) Inventor: Hiroaki Morimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/356,503

(22) Filed: Jul. 21, 2023

(65) Prior Publication Data
US 2024/0036778 A1 Feb. 1, 2024

(30) Foreign Application Priority Data
Jul. 26, 2022 (JP) .................. 2022-118396

(51) Int. Cl.
*G06F 3/12* (2006.01)

(52) U.S. Cl.
CPC ............ *G06F 3/121* (2013.01); *G06F 3/1235* (2013.01); *G06F 3/1253* (2013.01)

(58) Field of Classification Search
CPC ...... G06F 3/121; G06F 3/1235; G06F 3/1253; G06F 3/1228; G06F 3/1232; G06F 3/1285; G06F 3/1234; G06F 3/1202; G06F 3/1293; G06F 3/1207; G06F 3/1276; G06F 3/1218; G06F 3/1219
See application file for complete search history.

(56) References Cited

U.S. PATENT DOCUMENTS

| | | | |
|---|---|---|---|
| 2020/0004471 A1 | 1/2020 | Shiohara | |
| 2020/0096928 A1* | 3/2020 | Moriya | G06F 3/121 |
| 2021/0326087 A1* | 10/2021 | Inoue | G06F 3/1232 |
| 2022/0137898 A1* | 5/2022 | Morita | G06F 3/121 |
| | | | 358/1.15 |
| 2022/0137906 A1* | 5/2022 | Ogawa | G06F 3/1285 |
| | | | 358/1.15 |
| 2022/0283750 A1* | 9/2022 | Yokoyama | G06F 3/121 |
| 2022/0317958 A1* | 10/2022 | Shiohara | G06F 3/1205 |
| 2022/0417371 A1* | 12/2022 | Nagao | G06F 3/1224 |

FOREIGN PATENT DOCUMENTS

| | | |
|---|---|---|
| JP | 2012137868 A | 7/2012 |
| JP | 2019074906 A | 5/2019 |
| JP | 2020126364 A | 8/2020 |
| JP | 2022073284 A | 5/2022 |

* cited by examiner

*Primary Examiner* — Juan M Guillermety
(74) *Attorney, Agent, or Firm* — Canon U.S.A., Inc., IP Division

(57) ABSTRACT

A non-transitory computer-readable storage medium stores a program executable by a computer of an information processing apparatus and configured to extend a function in association with print data generation software available on a plurality of different printers, the program causing the computer to execute processing including acquiring information from a printer among the plurality of printers; determining information to be displayed on a print setting screen of an operating system of the information processing apparatus, based on the information acquired from the printer; and notifying the operating system of the information processing apparatus of screen definition information defining the information to be displayed on the print setting screen.

10 Claims, 26 Drawing Sheets

FIG. 5A

```
{
    "display": [
        {
            "inkBar": [
                {
                    "name": "Black",
                    "value": "80"
                },
                {
                    "name": "Cyan",
                    "value": "80"
                },
                {
                    "name": "Magenta",
                    "value": "0"
                },
                {
                    "name": "Yellow",
                    "value": "0"
                }
            ],
            "button": [
                {
                    "title": "Purchase",
                    "url": "https://www.buyInk.com/Black=80&Cyan=80&Mageota=0&Yellow=0"
                }
            ]
        }
    ]
}
```

FIG. 5B

```
{
    "display": [
        {
            "printerError": [
                {
                    "errorCode": "1000",
                    "description": "The paper is out."
                }
            ],
            "button": [
                {
                    "title": "Error solving method",
                    "url": "https://www.error.com/1000"
                }
            ]
        }
    ]
}
```

FIG. 5C

```
{
  "display": [
    {
      "text": [
        {
          "description": "Please see the following link to the operation manual for the printer."
        }
      ],
      "button": [
        {
          "title": "Instruction manual",
          "url": "https://www.text.com/InkJetPrinter-1"
        }
      ]
    }
  ]
}
```

FIG. 5D

```
{
  "display": [
    {
      "text": [
        {
          "description": "Communication with the printer has failed. Please check that the printer is connected properly before start printing."
        }
      ]
    }
  ]
}
```

FIG. 8

```
{
    "display": [
        {
            "inkBar": [
                {
                    "name": "Black",
                    "value": "80"
                },
                {
                    "name": "Cyan",
                    "value": "80"
                },
                {
                    "name": "Magenta",
                    "value": "0"
                },
                {
                    "name": "Yellow",
                    "value": "0"
                }
            ],
            "button": [
                {
                    "title": "Purchase",
                    "url": "https://www.buyInk.com"
                }
            ],
            "priority": 1
        },
        {
            "printerError": [
                {
                    "errorCode": "1000",
                    "description": "The paper is out."
                }
            ],
            "button": [
                {
                    "title": "Error solving method",
                    "url": "https://www.error.com/1000"
                }
            ],
            "priority": 2
        }
    ]
}
```

```
{
    "display": [
        {
            "text": [
                {
                    "description": "Please see the following link to the method of setting postcard paper."
                }
            ],
            "button": [
                {
                    "title": "Method of setting paper",
                    "url": "https://www.text.com/howtoloadpaper/hagaki"
                }
            ]
        }
    ]
}
```

```
{
    "display": [
        {
            "text": [
                {
                    "description": "Estimated printing time: 5 min 25 sec"
                }
            ]
        }
    ]
}
```

FIG. 22A

```
{
    "display": [
        {
            "text": [
                {
                    "description": "The initial setting processing is incomplete. Please
                                    perform the initial setting processing."
                }
            ],
            "button": [
                {
                    "title": "Start initial setting processing",
                    "url": "IJPrinterSetupApp:InkJetPrinter-1"
                }
            ]
        }
    ]
}
```

FIG. 22B

```
{
    "display": [
        {
            "text": [
                {
                    "description": "The initial setting processing is incomplete. Please install
                                    the initial setting processing application and perform the
                                    initial setting processing."
                }
            ],
            "button": [
                {
                    "title": "Install initial setting processing application",
                    "url": "https://www.ijprinter.com/SetupApp"
                }
            ]
        }
    ]
}
```

INFORMATION PROCESSING APPARATUS TO EXTEND PRINT FUNCTION AND NON-TRANSITORY COMPUTER-READABLE STORAGE MEDIUM

BACKGROUND OF THE INVENTION

Field of the Invention

The present disclosure relates to a technique for extending printing functionality.

Description of the Related Art

In recent years, a standard class driver available in common on printers provided by different vendors has been provided under Windows® or the like. The standard class driver is hereinafter referred to also as a "standard driver". The standard driver is included in a package of an operating system (hereinafter referred to as an "OS"). The standard driver is configured to enable designation of a print function in accordance with Print Capabilities generated based on information acquired from a printer connected. The standard driver allows the user to designate a print function in accordance with the capabilities of a printer connected. The standard driver can be associated with an application for extending functionality (hereinafter referred to also as an "extension application"). The extension application is provided by a vendor that provides the printer. The vendor provides the extension application to provide a function (extended function) not feasible only by the standard driver. Japanese Patent Laid-Open No. 2019-74906 discloses a technique for extending a function such as a stamp function by using the extension application.

To use the extended function provided by of the extension application, the user explicitly performs an operation for displaying a screen of the extension application itself. This increases the number of operations to be performed by the user, which may impair convenience. Some pieces of information provided by the extension application, such as status information of the printer, may not be visible to the user at a desired timing.

SUMMARY OF THE INVENTION

Accordingly, an information processing apparatus according to an aspect of the present disclosure includes print data generation software available on a plurality of different printers, and an extension application configured to extend a function in association with the print data generation software. The extension application includes an acquisition unit configured to acquire information from a printer among the plurality of printers, a determination unit configured to determine information to be displayed on a print setting screen of an operating system of the information processing apparatus, based on the information acquired from the printer, and a notification unit configured to notify the operating system of the information processing apparatus of screen definition information defining the information to be displayed on the print setting screen of the operating system of the information processing apparatus.

Further features of the present invention will become apparent from the following description of exemplary embodiments with reference to the attached drawings.

BRIEF DESCRIPTION OF THE DRAWINGS

FIGS. 5A to 5D are views illustrating an example of screen definition information.

FIG. 8 is a view illustrating an example of screen definition information.

FIGS. 22A and 22B are views illustrating examples of screen definition information.

DESCRIPTION OF THE EMBODIMENTS

Figure 1:
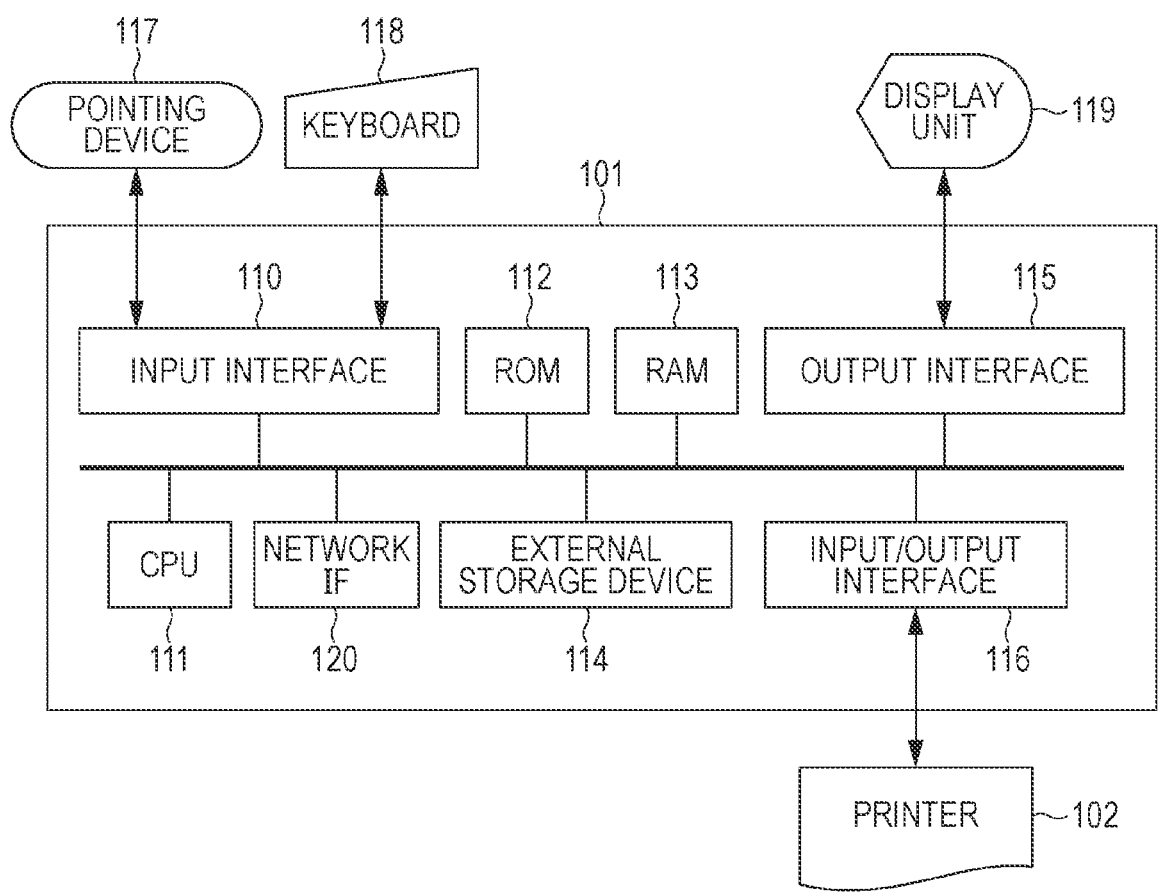
FIG. 1 is a block diagram illustrating a hardware configuration of a printing system.

Exemplary embodiments of the present disclosure will be described in detail hereinafter with reference to the accompanying drawings. The following embodiments do not limit the scope of the present disclosure. In addition, not all the combinations of features described in the embodiments are essential to implementing the present disclosure. The same elements are denoted by the same reference numerals, and a description thereof will be omitted.

First Embodiment

FIG. 1 is a block diagram illustrating a hardware configuration of a printing system according to the present embodiment. The printing system includes a host computer 101. FIG. 1 mainly illustrates a block configuration of the host computer 101. The host computer 101 is an example of an information processing apparatus. The host computer 101 includes an input interface 110, a central processing unit (CPU) 111, a read-only memory (ROM) 112, a random access memory (RAM) 113, an external storage device 114, an output interface 115, an input/output interface 116, and a network interface (network IF) 120. Input devices such as a keyboard 118 and a pointing device 117 are connected to the input interface 110. A display device such as a display unit 119 is connected to the output interface 115. The network IF 120 performs control to transfer data to and from an external device via a network. In the example illustrated in FIG. 1, the display unit 119, the pointing device 117, and the keyboard 118 are illustrated as examples of a device separate from the host computer 101. However, the display unit 119, the pointing device 117, and the keyboard 118 may be included in the host computer 101. The display unit 119 may be a touch panel display having the functions of an input/output device.

The ROM 112 stores an initialization program. The external storage device 114 stores application programs, an operating system (OS), print data generation software, and various other data. The RAM 113 is used as a work memory or the like when various programs stored in the external storage device 114 are executed. Accordingly, the various programs can operate in the host computer 101.

In the present embodiment, the CPU 111 performs processing in accordance with a procedure of a program stored in the ROM 112, thereby executing functions and processes in the host computer 101, which will be described below.

A printer 102 serving as an output device is connected to the host computer 101 through the input/output interface 116. In the example illustrated in FIG. 1, as a non-limiting example, the host computer 101 and the printer 102 are separate. However, the host computer 101 and the printer 102 may be included in a single information processing apparatus. In one example, the printer 102 will be described as an inkjet printer that ejects ink onto a surface of a sheet to perform printing. In another example, the printer 102 may perform printing by using any other method such as an electrophotographic method. The host computer 101 may be a desktop personal computer, a smartphone, a tablet terminal, or a notebook personal computer. The input/output interface 116 may be wired or wireless. The host computer 101 and the printer 102 may be connected to each other via a local area network (LAN) or a wide area network (WAN) such as the Internet.

Figure 2A:
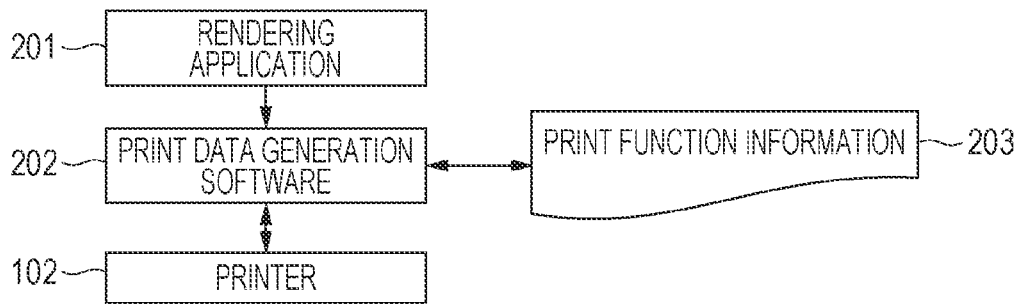
FIGS. 2A and 2B are diagrams schematically illustrating configurations of printing systems.
Figure 2B:
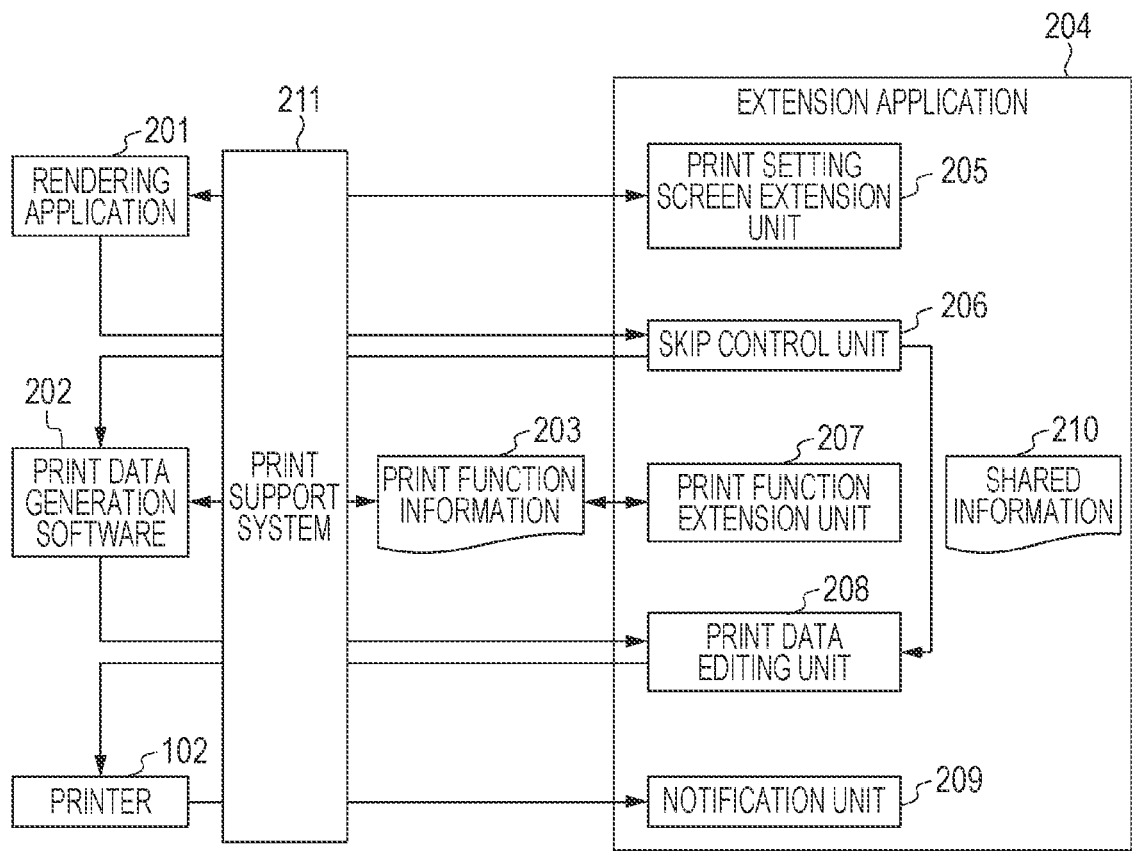

FIGS. 2A and 2B are diagrams schematically illustrating configurations of printing systems. The following description is based on the assumption that a printing system including the host computer 101 with Microsoft® Windows® 10 installed thereon as the OS is used. FIG. 2A illustrates a typical configuration in which an extension application 204 is not associated with print data generation software 202 or the printer 102. That is, FIG. 2A illustrates a configuration of a printing system in which the extension application 204 is not used. By contrast, FIG. 2B illustrates a configuration of the printing system according to the present embodiment in which the extension application 204 is associated with the print data generation software 202 and the printer 102. First, an example of a printing system having a typical configuration will be described with reference to FIG. 2A. The printing system having a typical configuration includes a rendering application 201 and the print data generation software 202. Further, print function information 203 is stored in the RAM 113 or the external storage device 114. The rendering application 201 and the print data generation software 202 are programs operable on the host computer 101. The rendering application 201 is software for creating content (rendering data) to be printed. Examples of the rendering application 201 include various applications to be operated by the user, such as a document creation application and a spreadsheet application. Upon receipt of a print request from the user, the rendering application 201 issues a print instruction to the OS. The print instruction includes print setting information for instructing the operation of the print data generation software 202 and the printer 102. The print setting information is also referred to as Print Ticket (hereinafter abbreviated as "PT"). The rendering application 201 can display a print setting screen, which is provided by any of the print data generation software 202, the OS, and the rendering application 201, to set the print setting information (PT). The print setting screen includes setting items (hereinafter referred to also as "control items") indicating print functions that can be set, and control items indicating set values thereof. The print setting screen displays control items in accordance with capabilities information acquired from the print data generation software 202. The capabilities information is information that can be set as print settings. The capabilities information is also referred to as Print Capabilities (hereinafter abbreviated as "PC"). The print data generation software 202 determines the PC based on the print function information 203. The print function information 203 is data indicating all of the print functions that can be set, the set values thereof, and print functions for which an exclusive relationship between the set values is described. The print function information 203 is also referred to as Print Device Capabilities (PDC). The print function information 203 is included in a configuration file of the print data generation software 202, and is arranged in the external storage device 114 as an unchangeable file. Alternatively, the print function information 203 can also be dynamically generated by the print data generation software 202. Specifically, the print data generation software 202 or the OS can be configured to acquire attribute data of the printer 102 from the printer 102 and generate the print function information 203 in accordance with attribute information in the acquired attribute data. In the dynamic generation of the print function information 203, the generated print function information 203 is editable. The attribute data of the printer 102, which is acquired from the printer 102, is data of a response acquired when an IPP Get-Printer-Attributes operation is issued to the printer 102. IPP refers to Internet Print Protocol. The response includes attribute information indicating functions (printer capabilities) that can be designated in the printer 102 and set values associated with the attribute information. The data of the response is stored in the RAM 113.

With this configuration, the print data generation software 202 can be configured to allow the user to designate a print function available on each printer 102 in accordance with the printer 102 connected. That is, even when a printer having a different function or a printer developed by a different vendor is connected, the print data generation software 202 can be configured to allow the user to designate an available print function in accordance with the printer connected. The configuration of the print data generation software 202, which is installed with IPP Class Driver for Windows® 10, will be described.

The IPP Class Driver is a printer driver that executes print processing in accordance with the specifications of a standard print protocol called IPP, and is included in the package of the OS. The IPP Class Driver is not a printer driver unique to the model of the printer 102, but is a standard class driver available in common on a plurality of printers. The IPP Class Driver acquires attribute information of the connected printer 102 so that the user can designate print functions to be supported by the connected printer 102, and generates the print function information 203 on the basis of the acquired attribute information. As described above, the IPP Class Driver, which is the print data generation software 202, can dynamically generate the print function information 203 (i.e., PDC). The print setting information (PT) designated through the print setting screen displayed on the basis of the PC based on the print function information 203 (i.e., PDC) is included in the print instruction output from the rendering application 201. The print instruction output from the rendering application 201 includes the print setting information (PT) and data to be rendered. The OS generates intermediate data (also referred to as input data) in accordance with the print instruction output from the rendering application 201, and passes the intermediate data to the print data generation software 202. The data output from the rendering application 201 for printing is in Graphic Device Interface (GDI) format or Extensible Markup Language (XML) Paper Specification (XPS) format. When the IPP Class Driver is used as the print data generation software 202, if the data output from the rendering application 201 is GDI data, the OS converts the format of the data. Specifically, the OS converts GDI data output from the rendering application 201 into XPS data. Then, the XPS data obtained by conversion is transferred to the print data generation software 202 as intermediate data. On the other hand, if the data output from the rendering application 201 is XPS data, the OS passes the XPS data to the print data generation software 202 as intermediate data. The intermediate data includes rendering data, which is information on an image to be formed on a surface of a sheet, and the print setting information (PT), which is set by the user. The print data generation software 202 converts the acquired intermediate data into print data interpretable by the printer 102, and transmits the print data to the printer 102. The print data includes rendering data, which is information on an image to be formed on a surface of a sheet, and print setting attribute information (attribute information for designating print settings) generated based on the print setting information set by the user. The print setting attribute information includes attribute information indicating functions (printer capabilities) that can be designated in the printer 102 and set values associated with the attribute information. The printer 102 performs printing on a surface of a sheet on the basis of the print data sent from the print data generation software 202. At this time, the printer 102 performs an operation in accordance with the print setting attribute information included in the print data to form the rendering data included in the print data on a surface of a sheet. The print setting attribute information includes attribute information for designating print quality (such as image quality priority or speed priority), duplex (or double-sided) printing, and the like, set values thereof, and the like. For example, if the print setting attribute information includes attribute information for designating duplex printing, the printer 102 executes duplex printing.

FIG. 2B illustrates a configuration according to the present embodiment in which the extension application 204 is associated with the print data generation software 202 and the printer 102. The elements and processes not particularly mentioned below are the same as the elements and processes illustrated in FIG. 2A. The extension application 204 is software for extending the functionality of the print data generation software 202. The extension application 204 is not included in the OS in advance (not packaged together). Thus, the user operates the host computer 101 to download the extension application 204 from a server via the Internet, and installs the extension application 204 into the host computer 101. Alternatively, the extension application 204 may be automatically installed into the host computer 101 in response to the printer 102 being connected to the host computer 101. Specifically, when the printer 102 is connected to the host computer 101, the OS acquires device identification information from the printer 102. The OS may download the extension application 204 corresponding to the acquired device identification information from a server via the Internet and install the extension application 204 into the host computer 101. As described above, the print data generation software 202 and the extension application 204 are stored in the host computer 101 as separate files. The print data generation software 202 and the extension application 204 may be updated and upgraded, and this update processing is also performed at different timings. That is, the timing at which the print data generation software 202 is acquired by the host computer 101 is different from the timing at which the extension application 204 is acquired. Further, the trigger by which the print data generation software 202 is acquired by the host computer 101 is different from the trigger by which the extension application 204 is acquired. When the extension application 204 is installed, the OS associates the extension application 204 with the print data generation software 202 and the corresponding printer 102. The extension application 204 described in the present embodiment includes a print setting screen extension unit 205, a skip control unit 206, a print function extension unit 207, a print data editing unit 208, and a notification unit 209. The extension application 204 further includes shared information 210 that can be accessed in common from the respective units. The entity of the shared information 210 is a file stored in the external storage device 114 or information stored in the RAM 113. The extension application 204 writes and reads information to and from the shared information 210 by using an application program interface (API) provided by the OS. The extension application 204 may terminate the operation each time the processing of each unit is completed. In this case, the OS activates the extension application 204 each time a request to use each unit is received. Other embodiments are also conceivable. For example, the OS terminates the operation of the extension application 204 when the processing of the print setting screen extension unit 205 is completed. Alternatively, the OS may keep the extension application 204 activated even after the processing of the skip control unit 206 is completed. Further, the extension application 204 may cancel the processing when the processing of each unit is being performed. When the extension application 204 cancels the processing, the job being processed on the print queue is deleted by the OS. A print support system 211 is a component provided by the OS. The print support system 211 mediates between the extension application 204 and the rendering application 201, the print data generation software 202, and the printer 102 during transmission of various instructions and information. Upon receipt of a print request from the user, the rendering application 201 issues a print instruction to the print support system 211. The print instruction includes the print setting information (PT), as in the configuration illustrated in FIG. 2A. Even with the configuration illustrated in FIG. 2B, as with the configuration illustrated in FIG. 2A, the rendering application 201 can display a print setting screen for designating the print setting information (PT). In the configuration illustrated in FIG. 2B, a print setting screen provided by the extension application 204 is displayed. Specifically, a print setting screen provided by the print setting screen extension unit 205 included in the extension application 204 is displayed. That is, display control of the print setting screen is performed by the print setting screen extension unit 205. Whether the print setting screen provided by the print setting screen extension unit 205 is to be displayed depends on the user's operation. The print setting screen extension unit 205 can also extend display items on the print setting screen provided by the OS in accordance with the information acquired from the printer 102 or the information on the rendering application 201. This function will be described below with reference to FIG. 3. When the rendering application 201 receives a print request from the user and a print instruction is issued to the print support system 211, the print support system 211 activates the skip control unit 206. The skip control unit 206 performs a control process to determine whether to perform a skip process for skipping the processing of the print data generation software 202. The skip control unit 206 is not capable of acquiring the intermediate data or the print setting information. After the skip process of the skip control unit 206, the print support system 211 generates intermediate data in accordance with the print instruction output from the rendering application 201, and passes the intermediate data to the print data generation software 202. If the skip control unit 206 does not perform the skip process, the print data generation software 202 processes the intermediate data into print data interpretable by the printer 102, and passes the print data to the print data editing unit 208. On the other hand, if the skip process for the print data generation software 202 is performed, the intermediate data is passed to the print data editing unit 208 without being processed by the print data generation software 202. Accordingly, the intermediate data can be processed by the print data editing unit 208. In an example in which it is more desirable to skip the processing of the print data generation software 202, the print data editing unit 208 performs an enlargement/reduction process. The intermediate data can store data in vector format. The data in vector format is less deteriorated than data in raster format when enlarged and reduced. Thus, in a mode in which the print data generation software 202 outputs an image in raster format, it is generally desirable that the processing of the print data generation software 202 be skipped and the intermediate data be processed by the print data editing unit 208. The print data editing unit 208 edits the intermediate data passed from the print data generation software 202 through the print support system 211 or the print data processed by the print data generation software 202. The editing is performed such that, for example, in page layout printing, the print data editing unit 208 changes the layout of the intermediate data or the print data in accordance with the print setting information for page layout printing, which is received from the OS. The page layout printing allows, for example, data for N pages to be printed on every sheet, and is called Nin1 or N-up, where N indicates the number of pages. Further, the print data editing unit 208 is capable of displaying a user interface (UI) screen on the display unit 119. Thus, a layout result of the intermediate data or the print data can be displayed as a preview screen. After the print data editing unit 208 edits the print data, the print data is passed to the printer 102 through the print support system 211. The printer 102 performs printing on a surface of a sheet on the basis of the received print data.

When the processing of the print data generation software 202 is skipped by the skip control unit 206, the print data editing unit 208 may convert the received intermediate data into print data interpretable by the printer 102. The extension application 204 includes the print function extension unit 207. The print function extension unit 207 is capable of editing the print function information 203 (i.e., PDC) generated by the print data generation software 202 or the OS. That is, even if the print function information 203 is arranged in the external storage device 114 as an unchangeable file, the print function extension unit 207 can change the print function information 203. As described above, the extension application 204 has a function of editing the print function information 203 (i.e., PDC). The print function extension unit 207 is capable of adding a function provided by the extension application 204. The print function extension unit 207 is also capable of adding a function that is supported by the printer 102 but is not supported by the print data generation software 202, and adding an exclusive relationship between set values of print functions.

The OS activates the print function extension unit 207 when the extension application 204 is associated with the printer 102 and the print data generation software 202 for the first time. The OS may activate the print function extension unit 207 at any other timing such as when the OS is activated. Thus, in a case where an optional device (such as a finisher) is added to the printer 102 later and a function related to printing is extended, the print function extension unit 207 can detect the extended function and add the extended function to the print function information 203.

The extension application 204 includes the notification unit 209. The notification unit 209 is capable of displaying a notification to the user in response to occurrence of an error in the printer 102. For example, if a paper-out error occurs in the printer 102, the print support system 211 detects the error. Then, the print support system 211 uses a notification function called a toast notification, which is a function of the OS, to display a message on the display unit 119. In response to the user pressing the toast notification, the notification unit 209 of the extension application 204 is called by the OS, and a UI screen of the notification unit 209 is displayed. The UI screen of the notification unit 209 can display, for example, a detailed message of a paper-out error or how to load paper can be displayed. Pressing includes clicking with a mouse or the like, and touching or tapping on a touch panel display. The configuration of the extension application 204 for achieving the present embodiment is not limited to one including all of the functions (units) described above, and may be one including some of the functions or one including other functions. The extension application 204 may also be referred to simply as print software. As described above, the extension application 204 has at least one of the following functions. The functions include a function of displaying a print setting screen (the print setting screen extension unit 205) and a function of controlling whether to skip the processing of the print data generation software 202 (the skip control unit 206). The functions further include a function of editing print data input to a printer (the print data editing unit 208), and a function of extending a function that can be designated by the print data generation software 202 (the print function extension unit 207).

The functions further include a function of displaying a screen in response to the occurrence of an error in the printer 102 (the notification unit 209).

Figure 3:
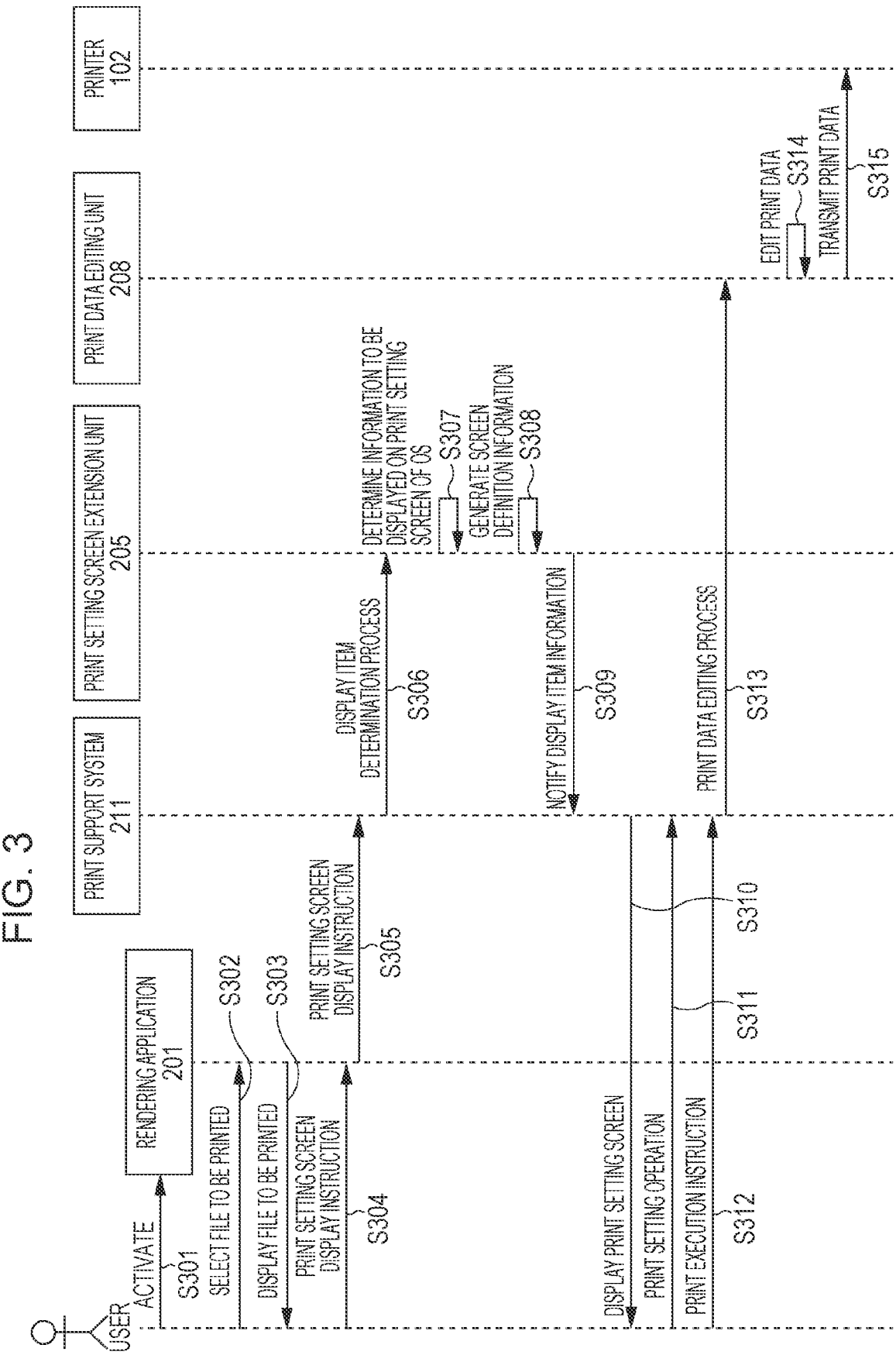
FIG. 3 is a sequence diagram illustrating an example of print processing.

FIG. 3 is a diagram illustrating the process flow of a process for extending display items on the print setting screen of the OS, which is performed by the print setting screen extension unit 205 in the present embodiment. First, the rendering application 201 starts the process in response to an instruction from the user (S301). Then, the rendering application 201 receives designation of a file to be printed from the user (S302), and renders the designated file on the screen of the application to display the content of the selected file to the user (S303). Subsequently, the rendering application 201 receives an instruction to display a print setting screen from the user to print the file displayed in S303 (S304). After S304, the rendering application 201 instructs the print support system 211 provided by the OS to display a print setting screen of the OS (S305). The print support system 211 also has a function of adding a display item to the print setting screen of the OS on the basis of screen definition information sent from the print setting screen extension unit 205. After that, the print support system 211 executes a display item determination process of the print setting screen extension unit 205 (S306). The display item determination process is a process for determining items to be displayed on the print setting screen of the OS by using the print setting screen extension unit 205. Upon receipt of an instruction to perform the processing of S306, the print setting screen extension unit 205 determines items to be displayed on the print setting screen of the OS (S307). After that, the print setting screen extension unit 205 generates screen definition information on the basis of the display items determined in S307 (S308), and notifies the print support system 211 of the generated screen definition information (notification process) (S309). Details of the processing of S307 and S308 will be described below with reference to FIG. 4. The print support system 211, which is notified of the screen definition information in S309, adds display items to the print setting screen of the OS in accordance with the notified information, and displays the print setting screen to the user (S310). The user performs a print setting operation on the print setting screen displayed by the print support system 211 to obtain a desired print result (S311). Examples of the operation include changing a paper size and a paper type. When S311 is completed, the user issues a print execution instruction to the print support system 211 (S312). Upon receipt of the print execution instruction, the print support system 211 receives the print data generated by the print data generation software 202 and causes the print data editing unit 208 to execute a print data editing process (S313). The print data editing unit 208 edits the print data on the basis of the print settings designated by the user in S311 (S314), and transmits the edited print data to the printer 102 (S315). The processing of S307 and S308, which is executed by the print setting screen extension unit 205, is executed as background processing without displaying the screen of the print setting screen extension unit 205.

Figure 4:
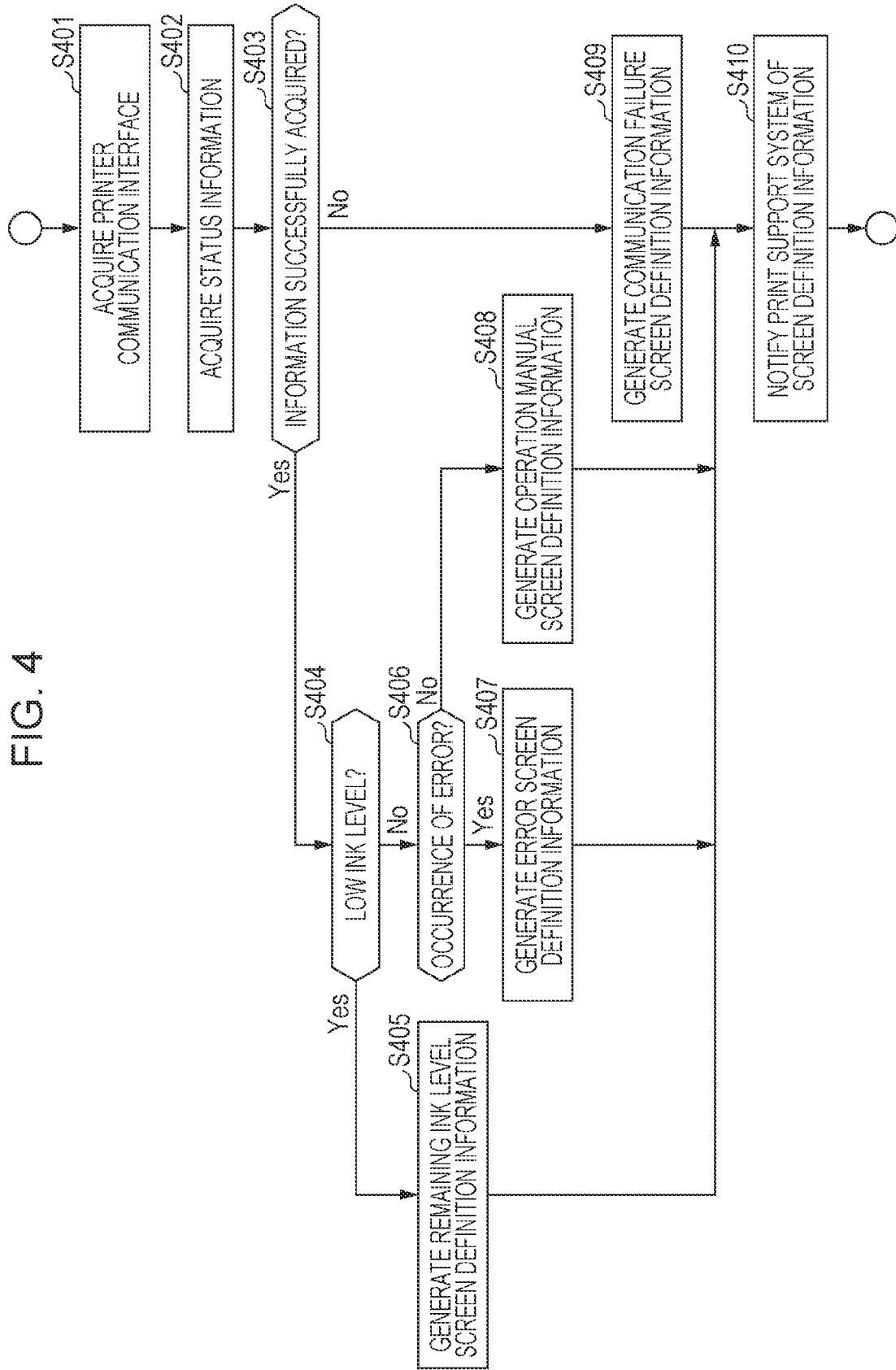
FIG. 4 is a flowchart illustrating an example of a display item determination process of a print setting screen extension unit.

FIG. 4 is a diagram illustrating details of the display item determination process (S307 and S308) of the print setting screen extension unit 205. First, the print setting screen extension unit 205 acquires a communication interface provided from the OS (S401). The communication interface is associated with the printer 102 and provides, to the print setting screen extension unit 205, a function of transmitting and receiving any information by using a communication protocol (e.g., IPP) supported by the printer 102. Subsequently, the print setting screen extension unit 205 acquires status information from the printer 102 via the printer communication interface (S402). In one example, the print setting screen extension unit 205 acquires remaining ink level information and error information in S402. After that, the print setting screen extension unit 205 determines whether the information is successfully acquired in S402 (S403). If Yes is determined in S403, the print setting screen extension unit 205 checks from the information acquired in S402 whether the ink cartridges mounted on the printer 102 include an ink cartridge with a low ink level (S404). Specific examples of the determination method in S404 include a method of determining whether the ink cartridges mounted on the printer 102 include an ink cartridge with an ink level less than a predetermined reference value. In another method, if the status information acquired from the printer 102 includes information explicitly indicating which ink cartridge has a low ink level, the information may be referred to. If Yes is determined in S404, the print setting screen extension unit 205 generates remaining ink level screen definition information (S405). On the other hand, if No is determined in S404, the print setting screen extension unit 205 checks whether an error that prevents printing has occurred in the printer 102 (S406). Specific examples of the determination method in S406 include a method of checking the presence or absence of a character string or a numerical value indicating the occurrence of an error from the information acquired in S402. If Yes is determined in S406, the print setting screen extension unit 205 generates error screen definition information including information on the error that has occurred (S407). On the other hand, if No is determined in S406, the print setting screen extension unit 205 generates operation manual screen definition information describing the operation method of the printer 102 (S408). If No is determined in S403, the print setting screen extension unit 205 generates communication failure screen definition information including information indicating that communication with the printer 102 has failed (S409). The print setting screen extension unit 205 notifies the print support system 211 of the screen definition information generated in any one of S405, S407, S408, and S409 (S410). After that, the print support system 211 adds a display item to the print setting screen of the OS in accordance with the screen definition information notified by the print setting screen extension unit 205. A specific example of the pieces of screen definition information generated in S405, S407, S408, and S409 is exemplified in FIGS. 5A to 5D.

FIGS. 5A to 5D are views illustrating a specific example of the pieces of screen definition information generated by the print setting screen extension unit 205 in S405, S407, S408, and S409, respectively. The screen definition information is expressed in JavaScript Object Notation (JSON) format, and the "display" tag includes items to be displayed on the print setting screen of the OS by the print support system 211. In FIG. 5A, the "inkBar" tag includes information representing the colors of the ink cartridges mounted on the printer 102 and the respective ink levels of the ink cartridges. The "name" tag represents the name of each ink color, and the "value" tag represents the level of remaining ink in each ink cartridge. The "button" tag defines the configuration of a button to be displayed on the print setting screen of the OS. The "title" tag represents the button name, and the "url" tag represents a uniform resource locator (URL) of a website for purchase of ink cartridges, which is displayed when the button is pressed. The URL represented by the "url" tag may reflect the remaining ink level acquired from the printer 102. The print setting screen displayed based on the screen definition information illustrated in FIG. 5A will be described in detail with reference to FIG. 6A. In FIG. 5B, the "printerError" tag includes information representing information on an error that has occurred in the printer 102.

The "errorCode" tag represents a numerical value for identifying an error, and the "description" tag represents a description of the error that has occurred. The "button" tag defines the configuration of a button to be displayed on the print setting screen of the OS. The "title" tag represents the button name, and the "url" tag represents a URL of a website indicating an error solving method, which is displayed when the button is pressed. The print setting screen displayed based on the screen definition information illustrated in FIG. 5B will be described in detail with reference to FIG. 6B. In FIG. 5C, the "text" tag includes information representing information on an operating instruction manual for the printer 102. The "description" tag represents a description that instructs reference to a page of the instruction manual on the web that shows the operation method of the printer 102. The "button" tag defines the configuration of a button to be displayed on the print setting screen of the OS. The "title" tag represents the button name, and the "url" tag represents a URL of a page of the instruction manual on the web, which is displayed when the button is pressed. The print setting screen displayed based on the screen definition information illustrated in FIG. 5C will be described in detail with reference to FIG. 6C. In FIG. 5D, the "text" tag includes information representing a description indicating that communication between the printer 102 and the information processing apparatus (e.g., the host computer 101) has failed. The print setting screen displayed based on the screen definition information illustrated in FIG. 5D will be described in detail with reference to FIG. 6D. The screen definition information may be expressed in a format different from the JSON format. A different format, for example, the Extensible Markup Language (hereinafter referred to also as XML) format, can be used to define the display items.

Figure 6A:
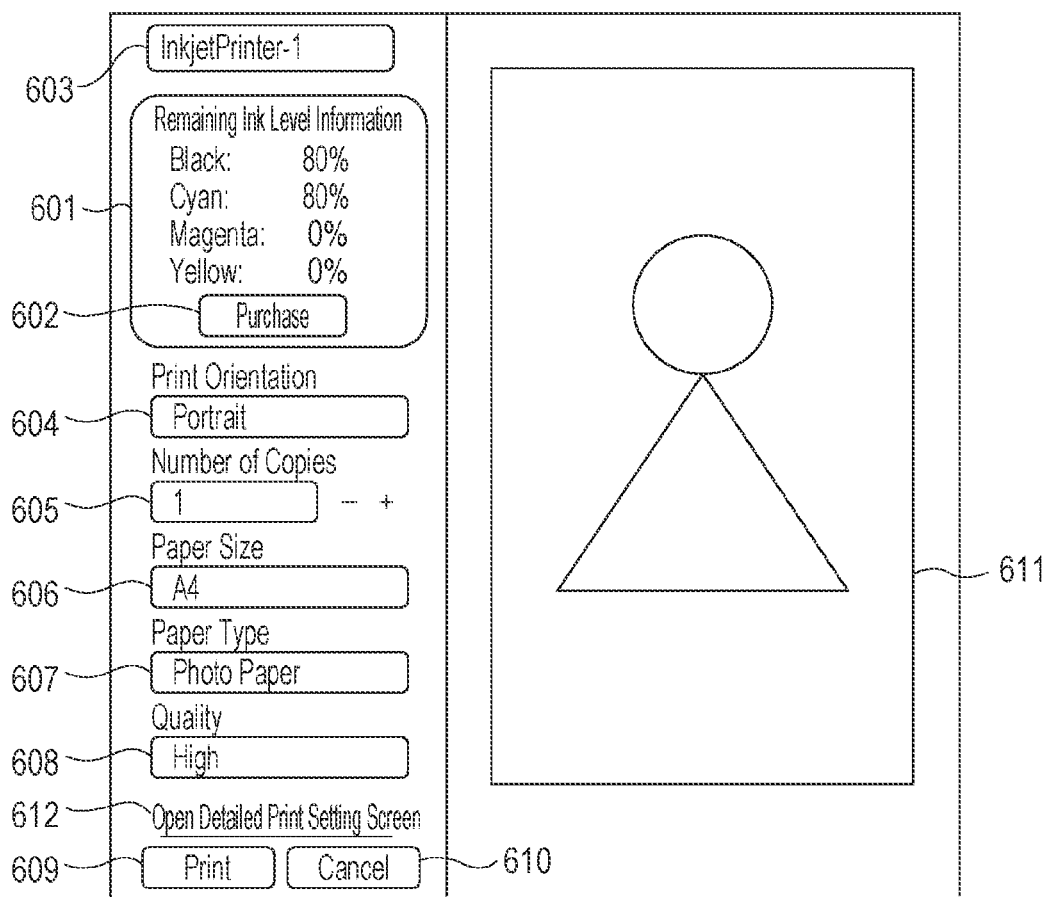
FIGS. 6A to 6D are views illustrating examples of a print setting screen.

FIGS. 6A to 6D are views illustrating a display example of print setting screens of the OS that are displayed by the print support system 211 in S310 in accordance with the pieces of screen definition information illustrated in FIGS. 5A to 5D. FIG. 6A illustrates a state in which the remaining ink level information is represented on the print setting screen of the OS in accordance with the screen definition information illustrated in FIG. 5A. An area 601 is an area for displaying items indicated by the screen definition information notified by the print setting screen extension unit 205. Other print setting items arranged, which include:

the name of a printer that performs print processing (area 603);
the print orientation (area 604);
the number of copies to be printed (area 605);
the paper size (area 606);
the paper type (area 607);
the print quality (area 608);
a print execution button (button 609);
a button for terminating the display of the print setting screen (button 610); and
a preview image of print data (area 611).

Figure 6B:
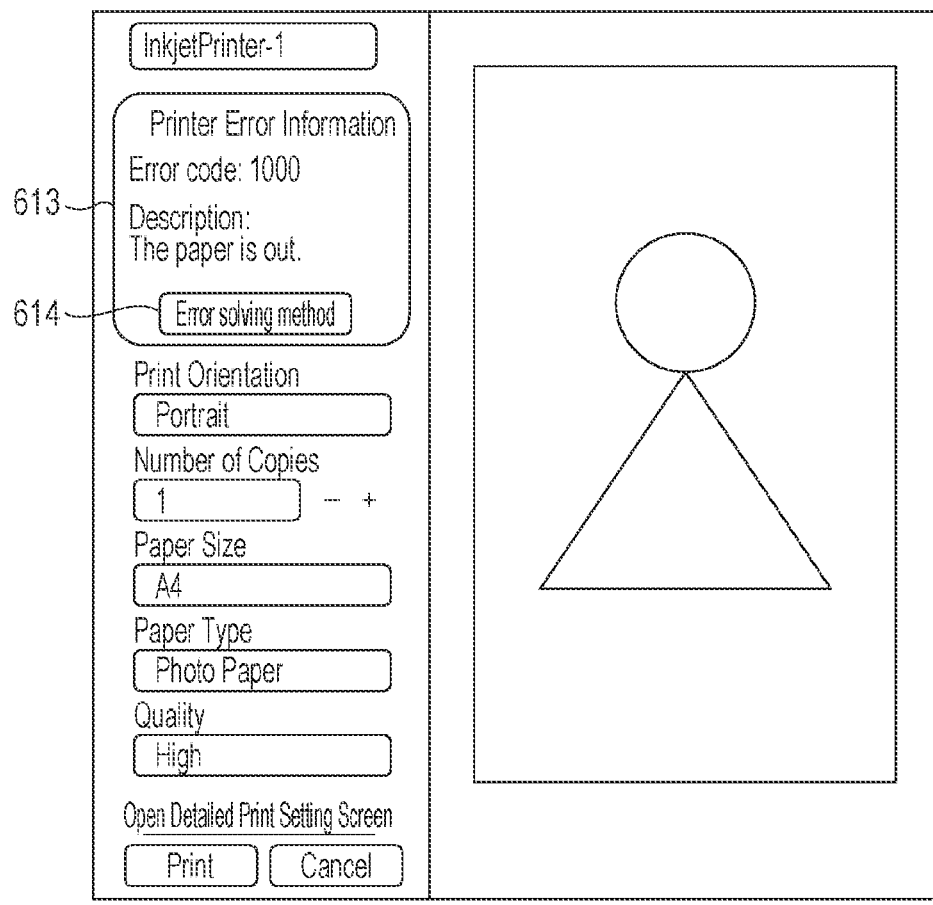

An area 612 is a link for displaying a graphical user interface (GUI) screen provided by the print setting screen extension unit 205. In response to the user selecting the area 612, the GUI display processing of the print setting screen extension unit 205 is enabled. The area 601 displays the remaining ink level information of each ink color and a button (button 602) for displaying the website for purchase of ink cartridges. The remaining ink level information of each ink color and the website for purchase of ink cartridges are included in the screen definition information illustrated in FIG. 5A. The button 602 is pressed to display the URL defined by the "url" tag in FIG. 5A on the web browser. FIG. 6B illustrates a state in which information on the error that has occurred in the printer 102 is represented in accordance with the screen definition information illustrated in FIG. 5B. An area 613 is an area for displaying items indicated by the screen definition information notified by the print setting screen extension unit 205. Other elements similar to those in FIG. 6A will not be described herein.

Figure 6C:
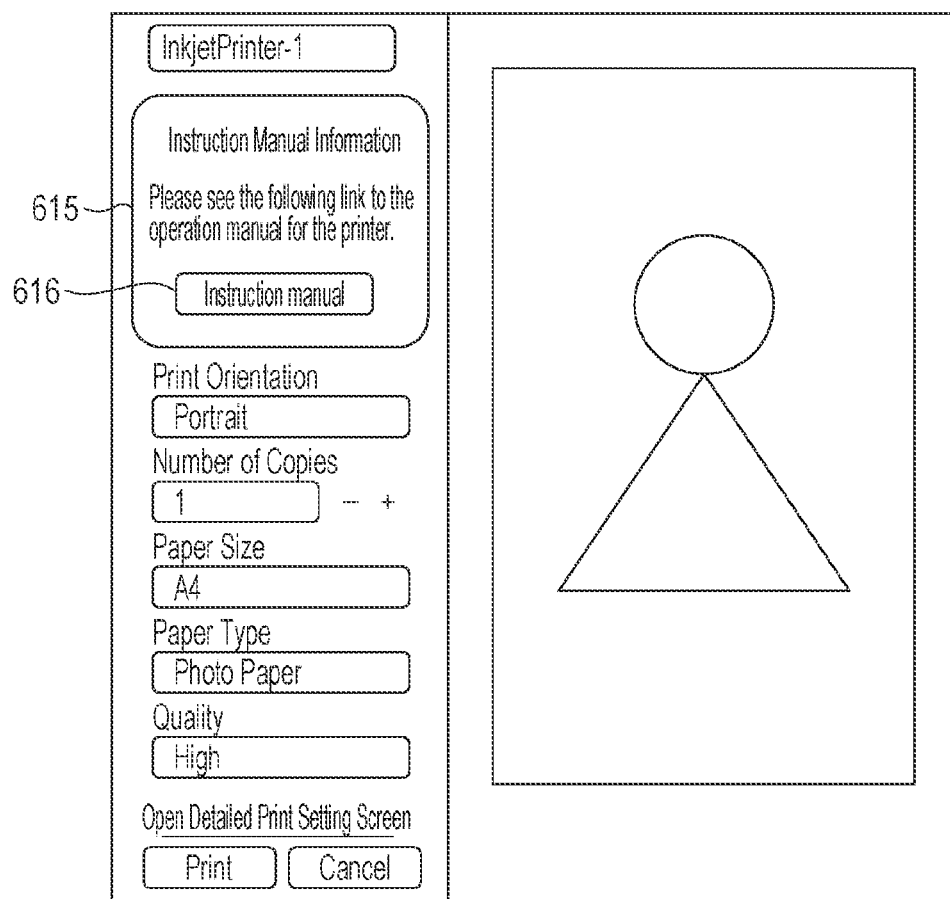
Figure 6D:
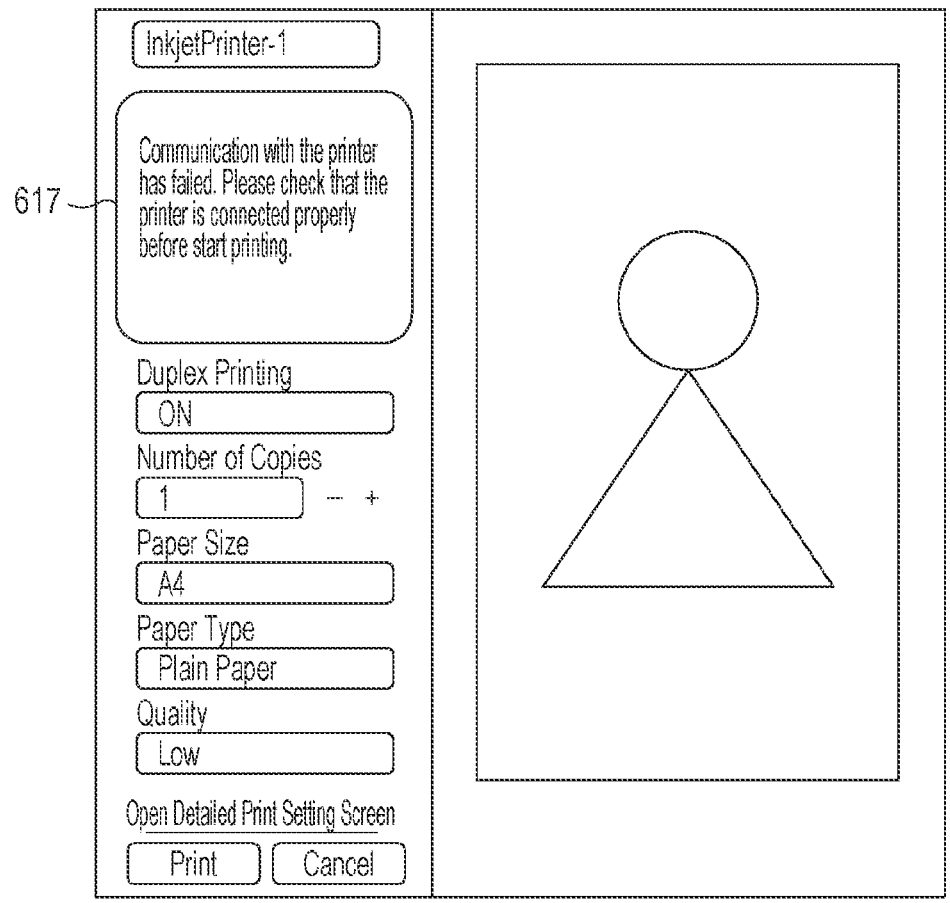

The area 613 displays a numerical value for identifying the error and a description of the error, which are included in the screen definition information illustrated in FIG. 5B. The area 613 also displays a button (button 614) for opening the website indicating the error solving method. The button 614 is pressed to display the URL defined by the "url" tag in FIG. 5B on the web browser. FIG. 6C illustrates a state in which information on the operating instruction manual for the printer 102 is represented in accordance with the screen definition information illustrated in FIG. 5C. An area 615 is an area for displaying items indicated by the screen definition information notified by the print setting screen extension unit 205. Other elements similar to those in FIG. 6A will not be described herein. The area 615 displays the description that instructs reference to the page of the instruction manual on the web, which is included in the screen definition information illustrated in FIG. 5C, and a button (button 616) for displaying the page of the instruction manual on the web. The button 616 is pressed to display the URL defined by the "url" tag in FIG. 5C on the web browser. FIG. 6D illustrates a state in which a description indicating that communication between the printer 102 and the information processing apparatus (e.g., the host computer 101) has failed is represented in accordance with the screen definition information in FIG. 5D. An area 617 is an area for displaying items indicated by the screen definition information notified by the print setting screen extension unit 205. The area 617 displays the description included in the screen definition information illustrated in FIG. 5D. The user checks the displayed description to recognize on the print setting screen of the OS that the connection between the printer 102 and the information processing apparatus is defective, before the user executes print processing.

According to the present embodiment, the print setting screen extension unit 205 generates screen definition information in accordance with the status information acquired from the printer 102, and notifies the OS of the screen definition information, thereby enabling important information to be displayed on the print setting screen of the OS. This allows the user to check the important information without performing a complicated operation.

Second Embodiment

The present embodiment describes a configuration for displaying a plurality of pieces of information on the print setting screen of the OS in the display item determination process of the print setting screen extension unit 205. The basic hardware configuration and software configuration are similar to those in the example described in the first embodiment, and a description thereof will thus be omitted.

Figure 7:
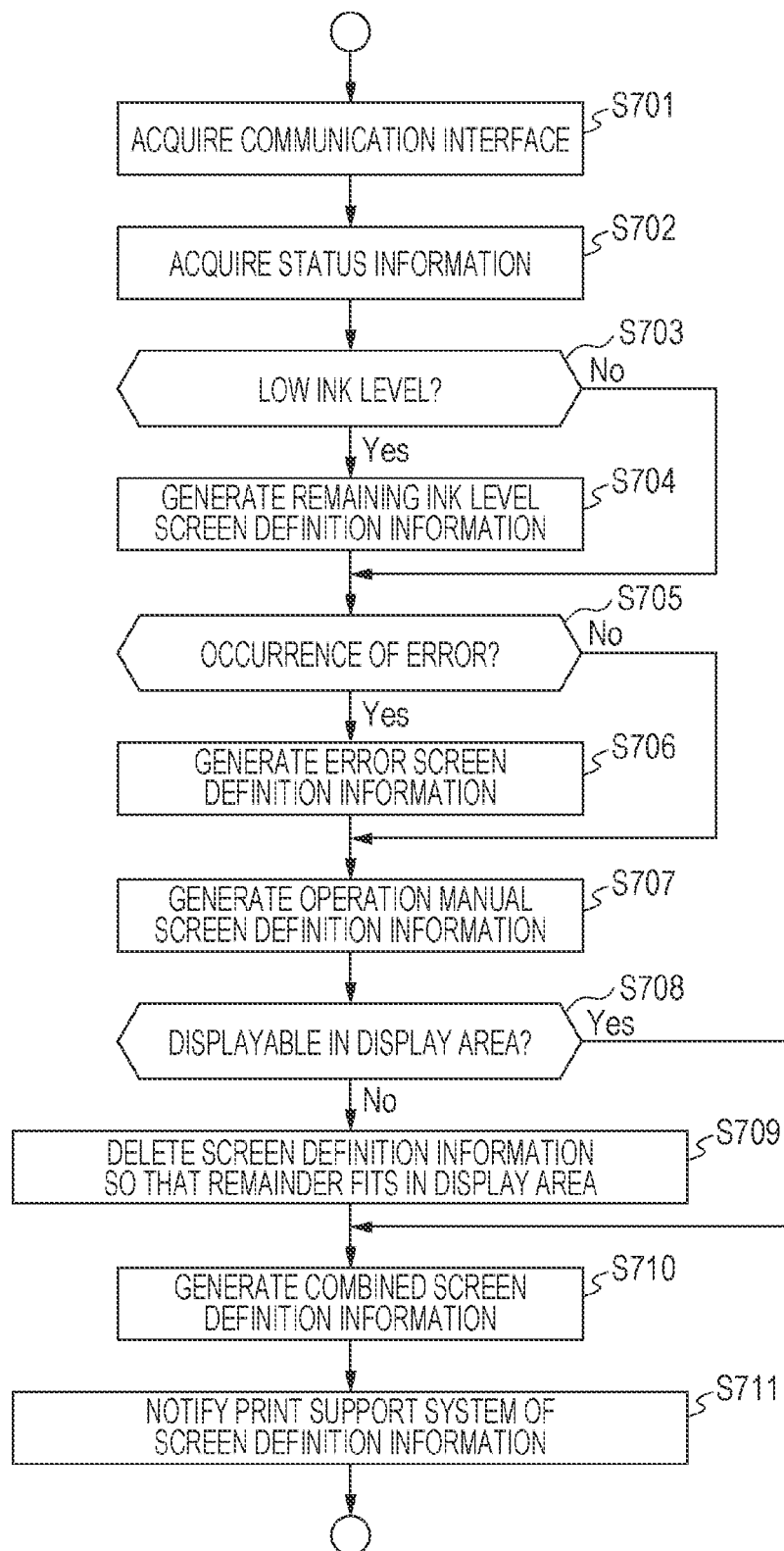
FIG. 7 is a flowchart illustrating an example of the display item determination process of the print setting screen extension unit.

FIG. 7 is a diagram illustrating details of the display item determination process (S307 and S308) of the print setting screen extension unit 205 in the present embodiment. First, the print setting screen extension unit 205 acquires a communication interface provided from the OS (S701). Subsequently, the print setting screen extension unit 205 acquires status information from the printer 102 through the communication interface (S702). In S702, the print setting screen extension unit 205 acquires remaining ink level information and error information. Subsequently, the print setting screen extension unit 205 checks from the information acquired in S702 whether the ink cartridges mounted on the printer 102 include an ink cartridge with a low ink level (S703). If Yes is determined in S703, the print setting screen extension unit 205 generates remaining ink level screen definition information (S704). Subsequently, the print setting screen extension unit 205 checks whether an error that prevents printing has occurred in the printer 102 from the information acquired in S702 (S705). If Yes is determined in S705, the print setting screen extension unit 205 generates error screen definition information including information on the error that has occurred (S706). On the other hand, if No is determined in S703 and S705, the print setting screen extension unit 205 skips the processing of S704 and S706, respectively. After that, the print setting screen extension unit 205 generates operation manual screen definition information describing the operation method of the printer 102 (S707). Subsequently, the print setting screen extension unit 205 determines whether the pieces of screen definition information generated up to S707 can be displayed in a display area of the print setting screen of the OS (S708). Specific examples of the determination method include a method of determining whether the number of pieces of generated screen definition information is equal to or less than a predetermined number. Other examples include a method of determining the size of an area used for displaying all of the pieces of generated screen definition information to determine whether the area fits in the display area of the print setting screen of the OS. If No is determined in S708, the print setting screen extension unit 205 deletes some of the pieces of generated screen definition information (S709). A method for determining pieces of screen definition information to be deleted is to, for example, determine the priority from the content of the pieces of screen definition information and delete pieces of screen definition information from the piece of screen definition information with the lowest priority until the remainder fits in the display area of the print setting screen of the OS. Specifically, each piece of screen definition information includes a numerical value indicating the priority, and the print setting screen extension unit 205 refers to information on the respective numerical values and determines the priority from the magnitude of the numerical values. On the other hand, if Yes is determined in S708, the print setting screen extension unit 205 skips S709. After that, the print setting screen extension unit 205 combines the pieces of screen definition information generated up to S709 to generate new screen definition information (S710), and notifies the print support system 211 of the new screen definition information (S711). A specific example of the screen definition information generated in S710 is exemplified in FIG. 8.

FIG. 8 is a diagram illustrating a specific example of the screen definition information generated by the print setting screen extension unit 205 in S710. In the present embodiment, it is assumed that the pieces of screen definition information generated in S704 and S706 are combined. The "display" tag includes items to be displayed on the print setting screen of the OS by the print support system 211. Specifically, the "inkBar" tag represents remaining ink level information, and the "printerError" tag represents error information. The "inkBar" tag includes information representing the colors of the ink cartridges mounted on the printer 102 and the respective ink levels of the ink cartridges. The "name" tag represents the name of each ink color, and the "value" tag represents the level of remaining ink in each ink cartridge. The "button" tag defines the configuration of a button to be displayed on the print setting screen of the OS. The "title" tag represents the button name, and the "url" tag represents a URL of a website for purchase of ink cartridges, which is displayed when the button is pressed.

The "printerError" tag includes information representing information on an error that has occurred in the printer 102. The "errorCode" tag represents a numerical value for identifying an error, and the "description" tag represents a description of the error that has occurred. The "button" tag defines the configuration of a button to be displayed on the print setting screen of the OS. The "title" tag represents the button name, and the "url" tag represents a URL of a website indicating an error solving method, which is displayed when the button is pressed. The "priority" tag represents a numerical value indicating the priority of each screen.

Figure 9:
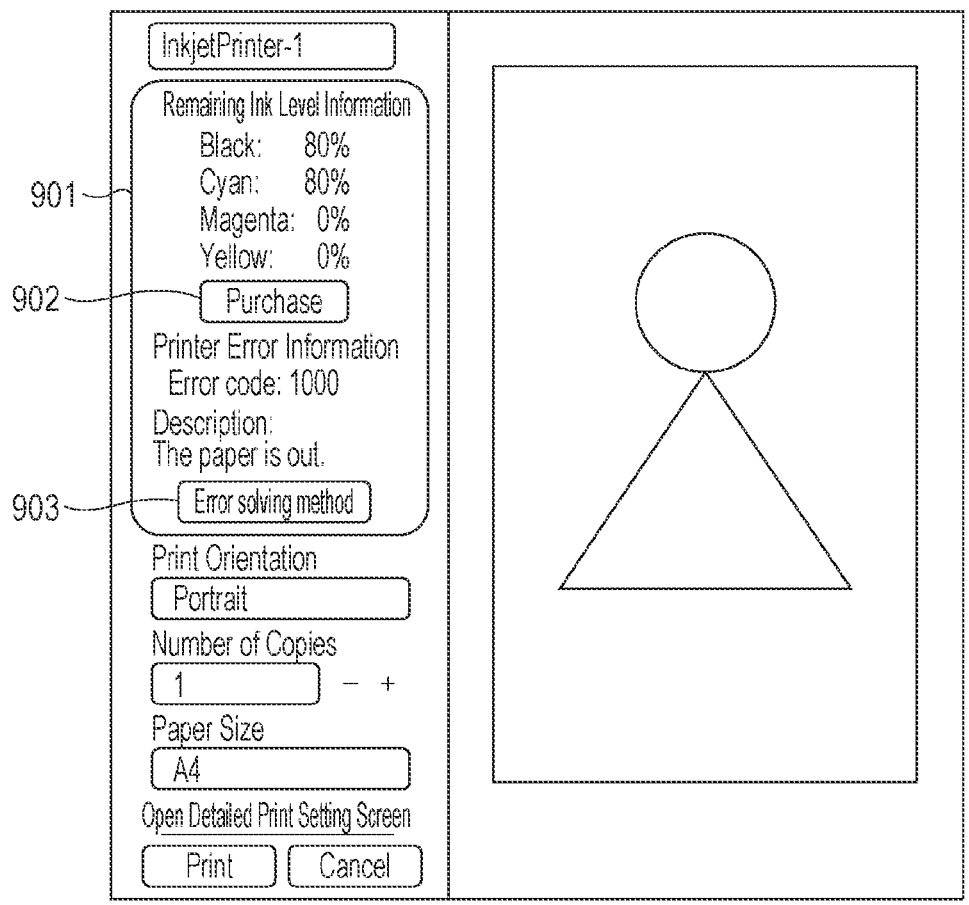
FIG. 9 is a view illustrating an example of a print setting screen.

FIG. 9 is a diagram illustrating a display example of a print setting screen of the OS in S310, which is displayed in accordance with the screen definition information illustrated in FIG. 8. An area 901 is an area for displaying items indicated by the screen definition information notified by the print setting screen extension unit 205. The area 901 displays the remaining ink level information of each ink color and a button (button 902) for displaying the website for purchase of ink cartridges. The remaining ink level information of each ink color and the website for purchase of ink cartridges are included in the screen definition information illustrated in FIG. 8. The button 902 is pressed to display the URL defined by the "url" tag under the "button" tag arranged in the same hierarchy as the "inkBar" tag in FIG. 8 on the web browser. The area 901 further displays a numerical value for identifying the error and a description of the error, which are included in the screen definition information illustrated in FIG. 8. The area 901 also displays a button (button 903) for opening the website indicating the error solving method. The button 903 is pressed to display the URL defined by the "url" tag under the "button" tag arranged in the same hierarchy as the "printerError" tag in FIG. 8 on the web browser.

According to the present embodiment, the print setting screen extension unit 205 generates a plurality of pieces of screen definition information that can be included in a predetermined display area of the print setting screen of the OS, in accordance with the status information acquired from the printer 102. As a result, a larger amount of important information can be displayed on the print setting screen of the OS. This allows the user to fully check the important information without performing a complicated operation. The present embodiment has been described on the assumption that the priority of each screen added by the print setting screen extension unit 205 is fixed for each screen. In some embodiments, the user may be allowed to designate a desired priority. For example, the print setting screen extension unit 205 provides a mechanism for allowing the user to designate the priority of each screen on the print setting screen of the OS or the print setting screen provided by the print setting screen extension unit 205. The priority determination may be performed in accordance with the priority input by the user using the mechanism.

Third Embodiment

The present embodiment describes a configuration for selecting appropriate default values for the print settings on the basis of the information acquired from the printer 102 in the display item determination process of the print setting screen extension unit 205. The basic hardware configuration and software configuration are similar to those in the example described in the first embodiment, and a description thereof will thus be omitted.

Figure 10:
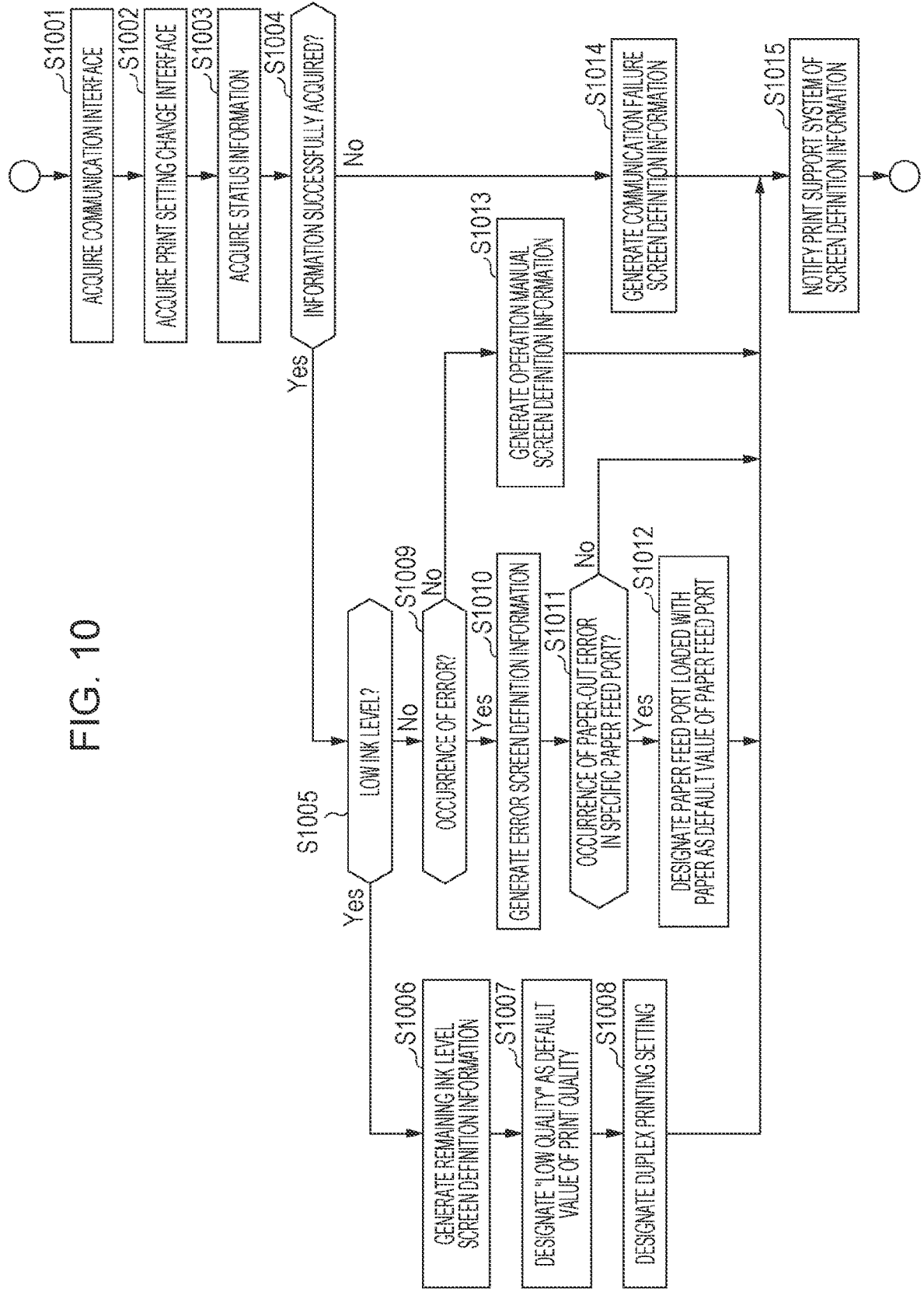
FIG. 10 is a flowchart illustrating an example of the display item determination process of the print setting screen extension unit.

FIG. 10 is a diagram illustrating details of the display item determination process (S307 and S308) of the print setting screen extension unit 205 in the present embodiment. First, the print setting screen extension unit 205 acquires a communication interface provided from the OS (S1001). Subsequently, the print setting screen extension unit 205 acquires a print setting change interface provided from the OS (S1002). The print setting change interface provides, to the print setting screen extension unit 205, a function of adding or deleting a display item of each print setting to be displayed on the print setting screen of the OS and a function of changing a default value of each print setting. Subsequently, the print setting screen extension unit 205 acquires status information from the printer 102 through the communication interface (S1003). In S1003, the print setting screen extension unit 205 acquires remaining ink level information, error information, and paper information currently set in the printer 102. The paper information includes information on the remaining amount of paper set in front of each paper feed port attached to the printer 102. After that, the print setting screen extension unit 205 determines whether the process of acquiring the information in S1003 is successful (S1004). If Yes is determined in S1004, the print setting screen extension unit 205 checks from the information acquired in S1003 whether the ink cartridges mounted on the printer 102 include an ink cartridge with a low ink level (S1005). If Yes is determined in S1005, the print setting screen extension unit 205 generates remaining ink level screen definition information (S1006). Subsequently, the print setting screen extension unit 205 designates "low quality" as default print quality through the print setting change interface acquired in S1002 (S1007). Further, the print setting screen extension unit 205 designates the duplex printing setting through the print setting change interface (S1008). On the other hand, if No is determined in S1005, the print setting screen extension unit 205 checks from the information acquired in S1003 whether an error has occurred in the printer 102 (S1009). If Yes is determined in S1009, then, the print setting screen extension unit 205 generates error screen definition information including information on the error that has occurred (S1010). The print setting screen extension unit 205 further determines whether the error that has occurred is a paper-out error in a specific paper feed port (S1011). If Yes is determined in S1011, the print setting screen extension unit 205 designates a paper feed port loaded with a sufficient amount of paper (a paper feed port having a predetermined remaining amount of paper) as a default value (S1012). On the other hand, if No is determined in S1009, the print setting screen extension unit 205 generates operation manual screen definition information describing the operation method of the printer 102 (S1013). If No is determined in S1004, the print setting screen extension unit 205 generates communication failure screen definition information including information indicating that communication with the printer 102 has failed (S1014). Finally, the print setting screen extension unit 205 notifies the print support system 211 of the screen definition information generated in any one of S1006, S1010, S1013, and S1014 (S1015).

Figure 11A:
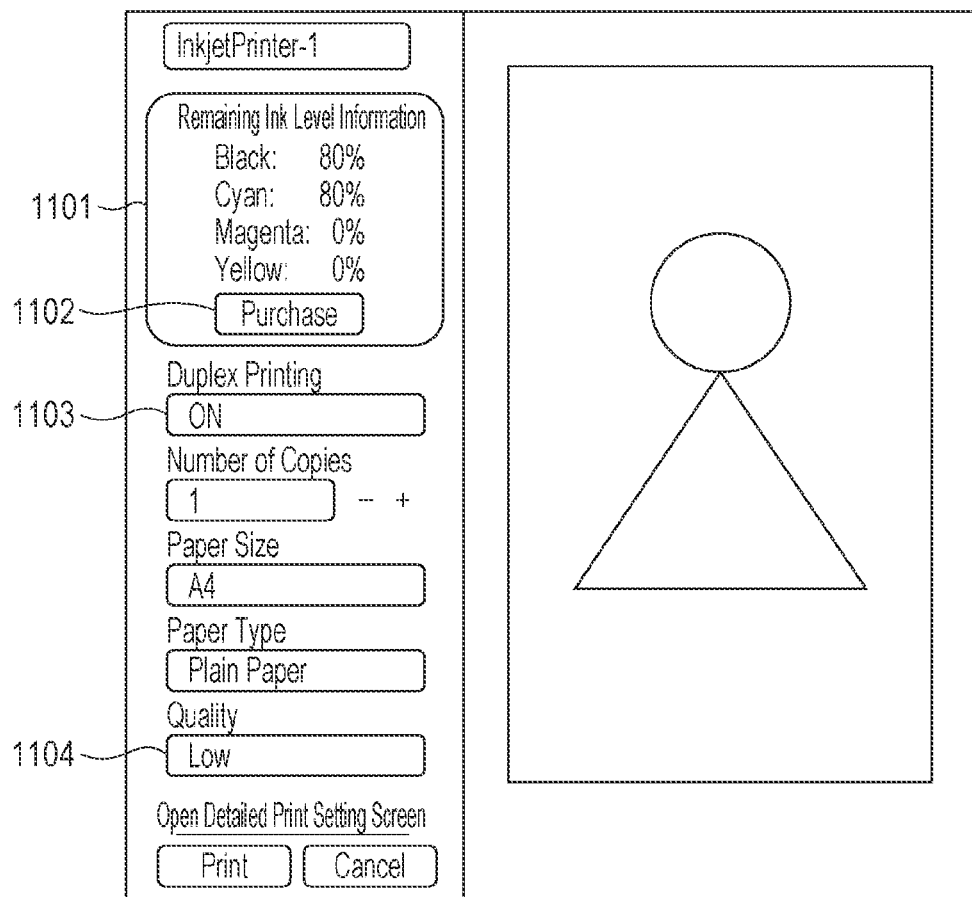
FIGS. 11A and 11B are views illustrating examples of a print setting screen.
Figure 11B:
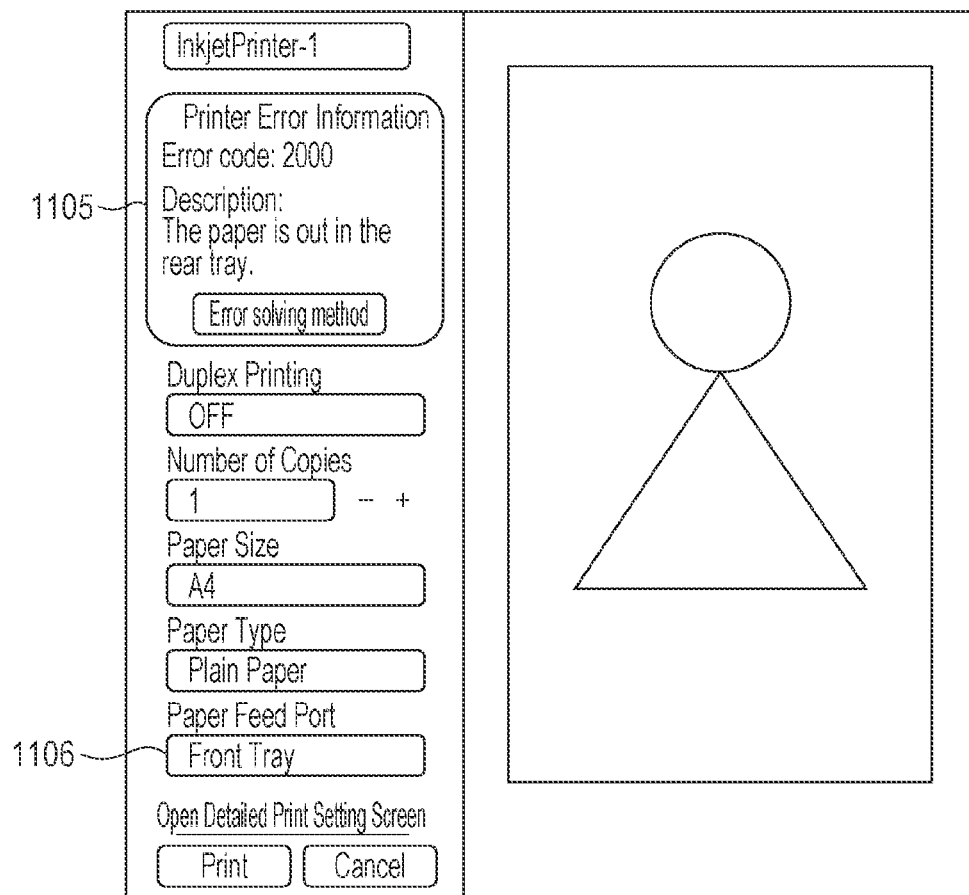

FIGS. 11A and 11B are views illustrating a display example of print setting screens of the OS that are displayed by the print support system 211 in S310 in accordance with the pieces of screen definition information generated through the processing of S1006 to S1008 and the processing of S1010 to S1012, respectively. The display example of the print setting screens based on the pieces of screen definition information generated in S1013 and S1014 is similar to that in FIGS. 6C and 6D, and a description thereof will thus be omitted. FIG. 11A is a view illustrating a display example of a print setting screen of the OS displayed in accordance with the screen definition information and a set default value of the print setting generated in the processing of S1006 to S1008 when it is determined that the remaining ink level of the printer 102 is low. An area 1101 is an area for displaying items indicated by the screen definition information notified by the print setting screen extension unit 205. The area 1101 displays the remaining ink level information of each ink color and a button (button 1102) for displaying the website for purchase of ink cartridges. The remaining ink level information of each ink color and the website for purchase of ink cartridges are included in the screen definition information illustrated in FIG. 8. The values designated in S1006 and S1007 in FIG. 10 are set as default values of "duplex printing" (an area 1103) and "quality" (an area 1104). FIG. 11B is a view illustrating a display example of a print setting screen of the OS displayed in accordance with the screen definition information and the default values of the print settings generated in the processing of S1010 to S1012 when it is determined that a paper-out error has occurred in a specific paper feed port of the printer 102. An area 1105 displays a numerical value for identifying the paper-out error and a description of the error. The area 1105 also displays a button for opening the website indicating the error solving method. Further, the paper feed port designated in S1012 is set as a default value of the "paper feed port" (an area 1106).

According to the present embodiment, if the print setting screen extension unit 205 determines from the status information acquired from the printer 102 that the remaining ink level is low, the default values of some print settings are changed so as to reduce the amount of ink consumption. This allows the user to apply an appropriate print setting such that printing can be continued with a reduced amount of ink consumption, without changing the print setting by himself/herself. Furthermore, if the print setting screen extension unit 205 determines from the status information acquired from the printer 102 that the remaining amount of paper in a specific paper feed port is small, the paper feed port loaded with a sufficient amount of paper is set as a default value. This allows the user to select a paper feed port loaded with a sufficient amount of paper, without changing the print settings by himself/herself. In the present embodiment, the "duplex printing" and "quality" settings are changed. However, any other setting may be changed. In the present embodiment, only the remaining ink level information of the printer 102 is used to change the default values of the print settings. However, the default values may be determined in accordance with not only the remaining ink level information but also the content to be printed. In one example, if the remaining ink level is low and the print target is text that can be printed with relatively low ink consumption, the print setting is changed so as to reduce the ink consumption. Further, when the default value of a print setting is changed, the print setting screen extension unit 205 may display a description indicating that the default value of the print setting is changed in the area 1101.

Fourth Embodiment

The present embodiment describes a configuration for selecting appropriate default values for the print settings on the basis of the information acquired from the printer 102 in the display item determination process of the print setting screen extension unit 205. The basic hardware configuration and software configuration are similar to those in the example described in the first embodiment, and a description thereof will thus be omitted.

Figures 12, 13:
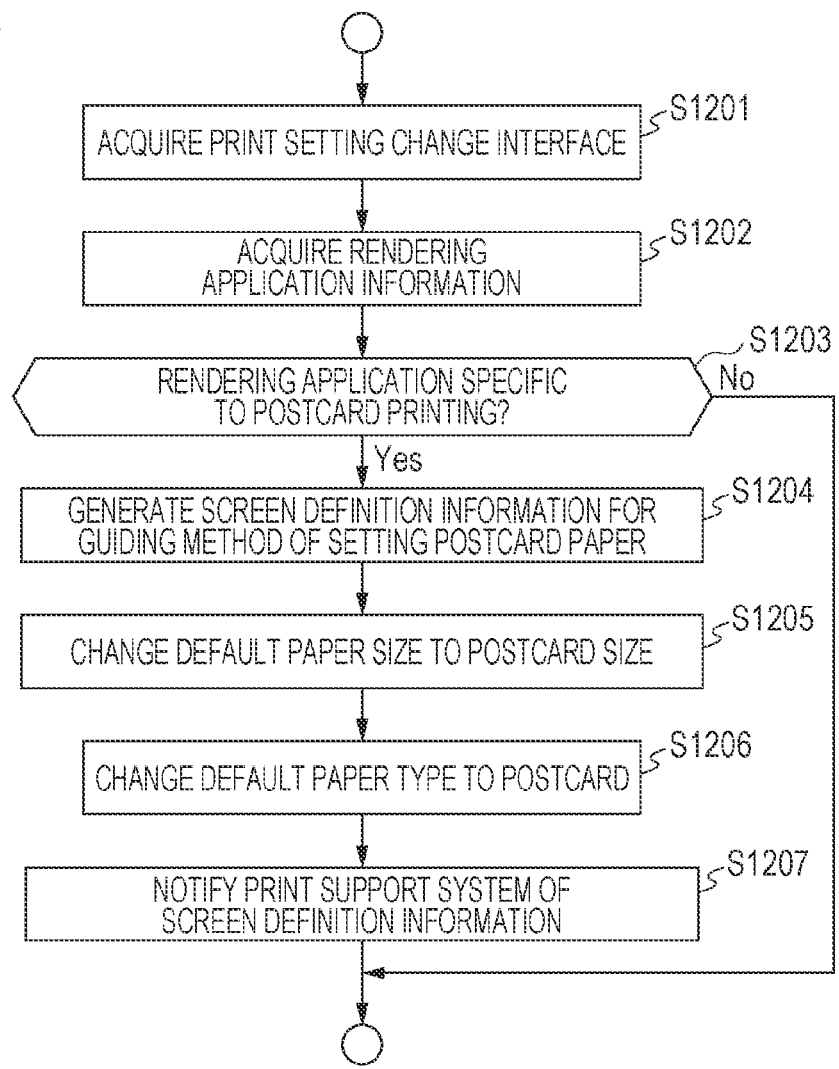
FIG. 12 is a flowchart illustrating an example of the display item determination process of the print setting screen extension unit.
FIG. 13 is a view illustrating an example of screen definition information.

FIG. 12 is a diagram illustrating details of the display item determination process (S307 and S308) of the print setting screen extension unit 205 in the present embodiment. First, the print setting screen extension unit 205 acquires a print setting change interface provided from the OS (S1201).

Subsequently, the print setting screen extension unit 205 acquires information on the rendering application 201 provided by the print support system 211 (S1202). Examples of the information acquired in S1202 include the name of the rendering application 201, an application identifier for identifying the rendering application 201, and a file type supported by the rendering application 201. Subsequently, the print setting screen extension unit 205 determines from the information acquired in S1202 whether the rendering application 201 is an application for postcard printing (S1203). Examples of the determination method of S1203 include a method of determining whether the application name acquired in S1202 includes the word "postcard". Examples of the determination method of S1203 further include a method of determining whether the application identifier acquired in S1202 matches an identifier indicating a postcard printing application. If Yes is determined in S1203, the print setting screen extension unit 205 generates screen definition information for guiding a method of setting postcard paper (S1204). A specific example of the screen definition information generated in S1204 is exemplified in FIG. 13. Subsequently, the print setting screen extension unit 205 designates the "postcard" size as a default paper size through the print setting change interface acquired in S1201 (S1205). Subsequently, the print setting screen extension unit 205 designates "postcard" as a default paper type through the print setting change interface (S1206). After that, the print setting screen extension unit 205 notifies the print support system 211 of the screen definition information generated in S1204 (S1207). On the other hand, if No is determined in S1203, the print setting screen extension unit 205 skips the processing of S1204 to S1207.

FIG. 13 is a diagram illustrating screen definition information generated through the process illustrated in FIG. 12 when the rendering application 201 is an application for postcard printing. The "display" tag includes items to be displayed on the print setting screen of the OS by the print support system 211. The "text" tag includes information representing information for guiding a method of setting postcard paper. The "description" tag represents a description that instructs reference to a website indicating a method of setting postcard paper. The "button" tag defines the configuration of a button to be displayed on the print setting screen of the OS. The "title" tag represents the button name, and the "url" tag represents a URL of the website displayed when the button is pressed.

Figure 14:
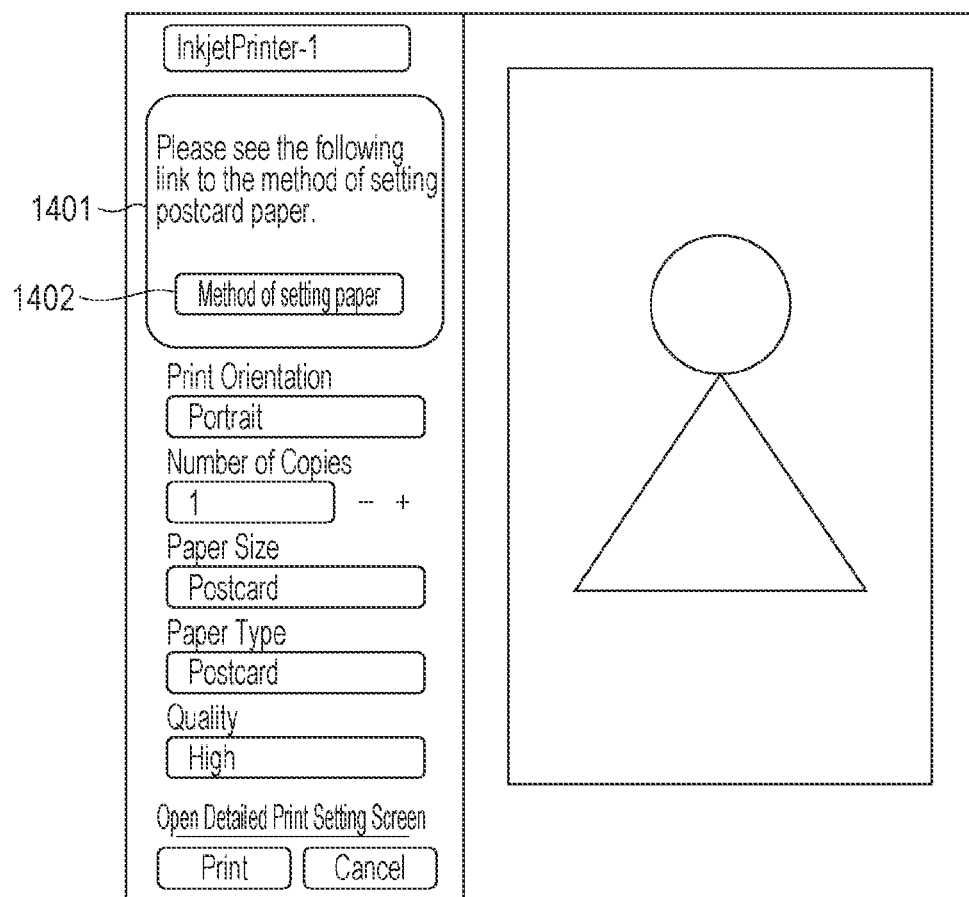
FIG. 14 is a view illustrating an example of a print setting screen.

FIG. 14 is a view illustrating a display example of a print setting screen of the OS that is displayed in accordance with the screen definition information illustrated in FIG. 13. An area 1401 is an area for displaying items indicated by the screen definition information notified by the print setting screen extension unit 205. The area 1401 displays the description that instructs reference to the website indicating the method of setting postcard paper, which is included in the screen definition information illustrated in FIG. 13, and a button (button 1402) for displaying the website indicating the method of setting postcard paper, which is included in the screen definition information illustrated in FIG. 13. The button 1402 is pressed to display the URL defined by the "url" tag in FIG. 13 on the web browser. While the display of the website on the web browser has been exemplified as the guide of the method of setting postcard paper, any other method is available.

In another example, the method of setting postcard paper may be guided by using an image illustrating the method of setting postcard paper. In this case, image information to be displayed may be set in the screen definition information generated by the print setting screen extension unit 205 to display a designated image in the area 1401 on the print setting screen of the OS.

According to the present embodiment, information on the rendering application 201 provided by the print support system 211 can be used to set appropriate default values for the print settings in accordance with the use of the rendering application 201. This allows the user who executes printing from a rendering application for a specific purpose (in the present embodiment, postcard printing) to refer to information on the specific purpose on the print setting screen of the OS. In addition, an unintended print result is prevented from being generated by automatic selection of a print setting optimal for the specific purpose. The present embodiment is based on the assumption that the rendering application 201 is an application for printing a postcard as an example of the specific purpose. However, the rendering application 201 may be used for any other purpose. In another example, the rendering application 201 may be an application for photo printing. In this case, the print setting screen extension unit 205 may reflect a print setting optimal for photo printing as a default value.

Fifth Embodiment

The present embodiment describes a configuration for selecting appropriate default values for the print settings on the basis of print history information of the user in the display item determination process of the print setting screen extension unit 205. The basic hardware configuration and software configuration are similar to those in the example described in the first embodiment, and a description thereof will thus be omitted.

Figure 15:
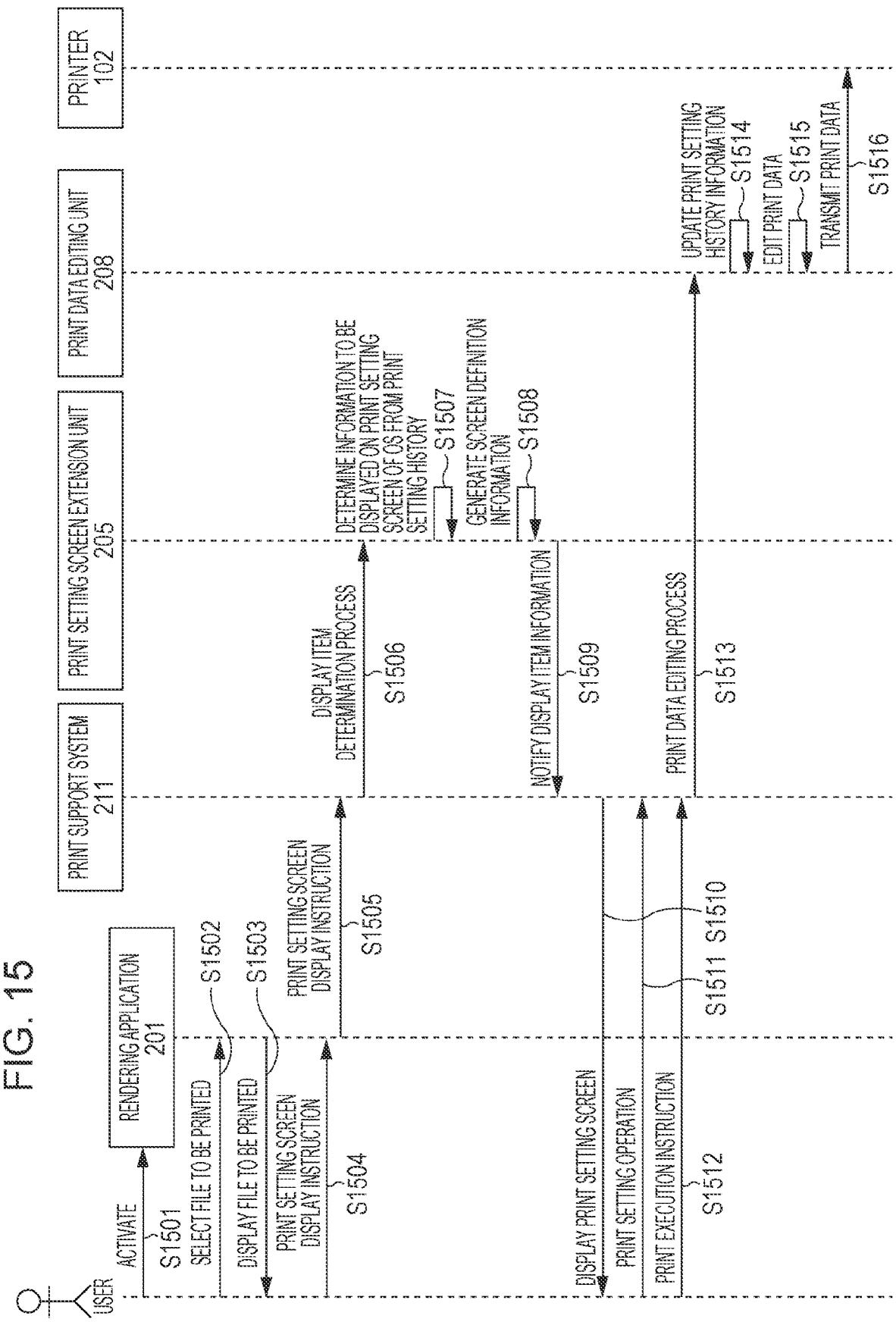
FIG. 15 is a sequence diagram illustrating an example of print processing.

FIG. 15 is a diagram illustrating the process flow of a process for extending display items on the print setting screen of the OS, which is performed by the print setting screen extension unit 205 in the present embodiment. The processing of S1501 to S1506 is similar to the processing of S301 to S306 in FIG. 3, and a description thereof will thus be omitted. After S1506, the print setting screen extension unit 205 determines items to be displayed on the print setting screen of the OS from print setting history information to be updated by the print data editing unit 208 (S1507). After that, the print setting screen extension unit 205 generates screen definition information on the basis of the display items determined in S1507 (S1508), and notifies the print support system 211 of the generated screen definition information (S1509). Details of the processing of S1507 and S1508 will be described below with reference to FIG. 17. The processing of S1510 to S1513 is similar to the processing of S310 to S313 in FIG. 3, and a description thereof will thus be omitted. In S1514, the print data editing unit 208 acquires values of various print setting items set in the print data, and updates the print setting history information by using the acquired information. After that, the print data editing unit 208 edits the print data on the basis of the print settings designated by the user in S1511 (S1515), and transmits the edited print data to the printer 102 (S1516). Details of the processing of S1514 to S1516 will be described below with reference to FIG. 16.

Figure 16:
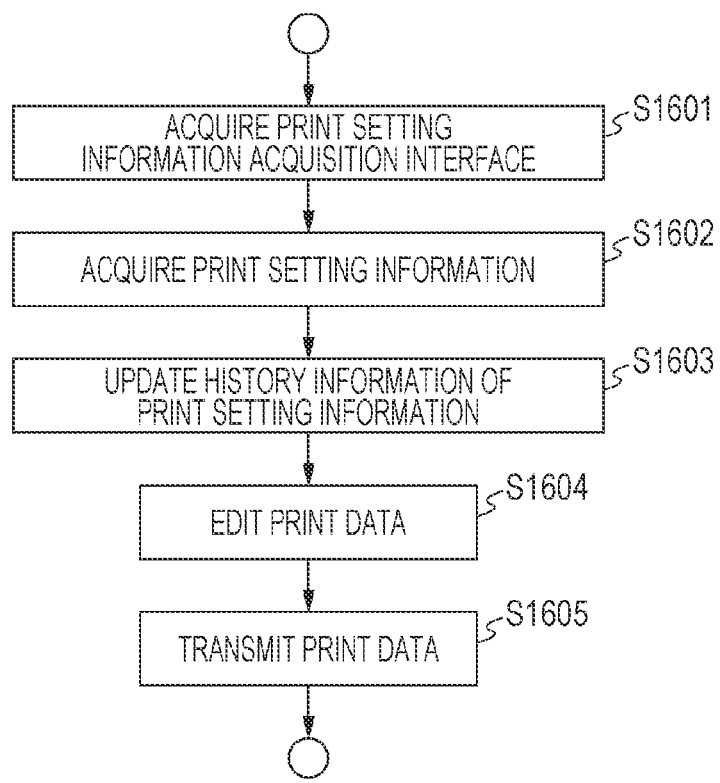
FIG. 16 is a flowchart illustrating an example of a process performed by a print data editing unit.

FIG. 16 is a diagram illustrating details of the processing of S1514 to S1516 performed by the print data editing unit 208 in FIG. 15. When the print support system 211 starts the print data editing process of the print data editing unit 208, first, the print data editing unit 208 acquires a print setting information acquisition interface provided from the OS (S1601).

The print setting information acquisition interface provides a function of acquiring various print settings set for print data to the print data editing unit 208. Subsequently, the print data editing unit 208 acquires values of various print setting items set in the print data through the print setting information acquisition interface (S1602). Specific examples of the print settings to be acquired include a paper size, a paper type, whether duplex printing is enabled, and print quality. After that, the print data editing unit 208 updates the print setting history information by using the various print settings acquired in S1602 (S1603). The print setting history information manages, for each user, the frequency of setting each setting item in each print setting item. This information is referred to, thereby enabling determination of a frequently used print setting item for each user. The print setting history information is stored in the shared information 210. Subsequently, the print data editing unit 208 edits the print data on the basis of the print settings designated by the user in S1511 (S1604), and transmits the edited print data to the printer 102 (S1605).

Figure 17:
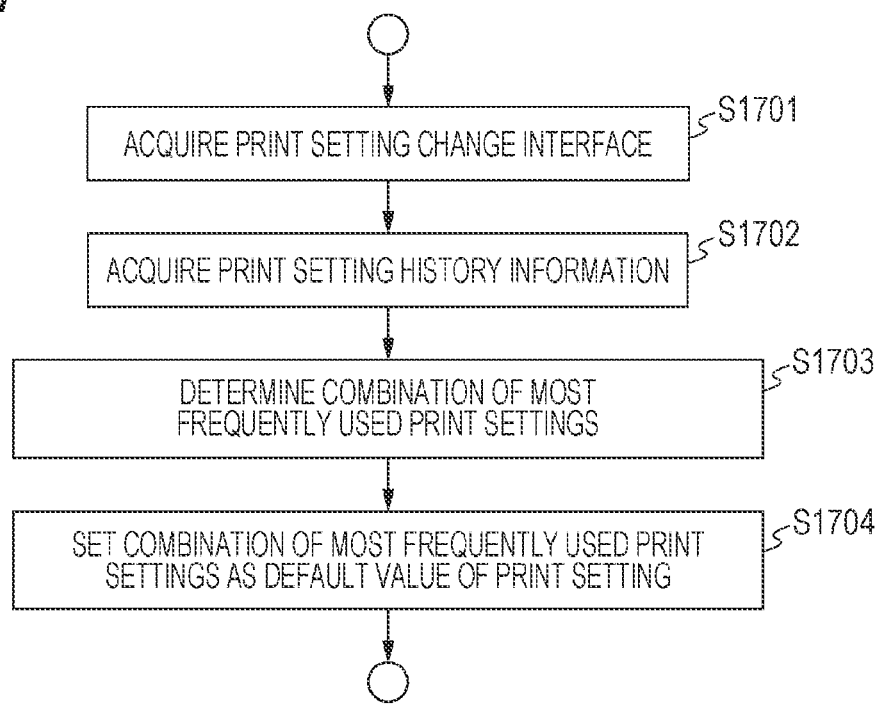
FIG. 17 is a flowchart illustrating an example of a process performed by the print setting screen extension unit.

FIG. 17 is a diagram illustrating details of the processing of S1507 and S1508 performed by the print setting screen extension unit 205 in FIG. 15. First, the print setting screen extension unit 205 acquires a print setting change interface provided from the OS (S1701). Subsequently, the print setting screen extension unit 205 acquires the print setting history information updated by the print data editing unit 208 in S1603 from the shared information 210 (S1702). The print setting screen extension unit 205 determines a combination of print settings frequently used by the user from the information acquired in S1702 (S1703). The print setting screen extension unit 205 sets the determined combination of print settings as a default value through the print setting change interface (S1704).

According to the present embodiment, the print data editing unit 208 updates history information of each print setting item set in the print data each time printing is executed. The print setting screen extension unit 205 refers to the information described above to set a frequently used print setting item as a default value to be displayed on the print setting screen of the OS. As a result, printing is repeatedly performed to automatically reflect a combination of frequently used print settings in the print setting items of the OS, which eliminates the need for the user to manually input frequently used print settings. Alternatively, the print setting screen extension unit 205 may display a frequently used print item among the print setting items in an upper portion of the print setting screen of the OS. This allows the user to easily check an important print setting item that is frequently used, even if not all of the print setting items can be displayed on the print setting screen of the OS having a small display area.

Sixth Embodiment

The present embodiment describes a configuration for estimating the time taken to complete printing on the basis of attribute information of print data in the display item determination process of the print setting screen extension unit 205 and displaying the estimated time on the print setting screen of the OS. The basic hardware configuration and software configuration are similar to those in the example described in the first embodiment, and a description thereof will thus be omitted.

Figures 18, 19:
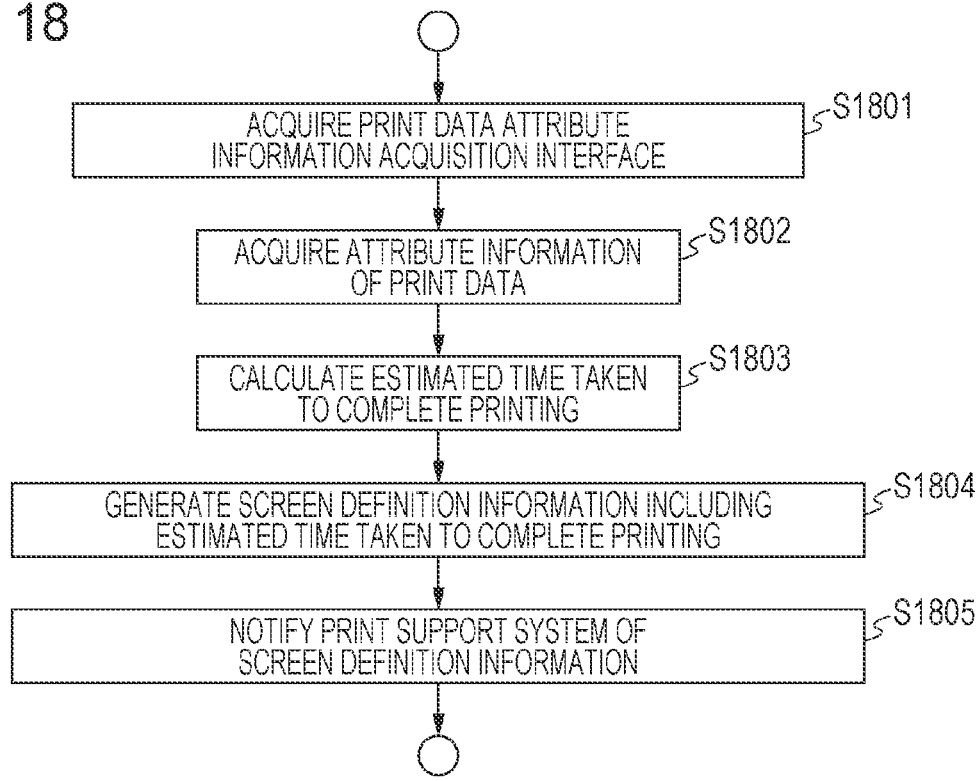
FIG. 18 is a flowchart illustrating an example of the display item determination process of the print setting screen extension unit.
FIG. 19 is a view illustrating an example of screen definition information.

FIG. 18 is a diagram illustrating details of the display item determination process (S307 and S308) of the print setting screen extension unit 205 in the present embodiment. First, the print setting screen extension unit 205 acquires a print data attribute information acquisition interface provided from the OS (S1801). The print data attribute information acquisition interface provides, to the print setting screen extension unit 205, a function of acquiring attribute information related to print data printed by the user. Subsequently, the print setting screen extension unit 205 acquires attribute information of the print data through the print data attribute information acquisition interface acquired in S1801 (S1802). Specific examples of the attribute information to be acquired include the size of the print data, the content (text or photograph), the number of pages, and the file name of a file from which the print data is generated. Then, the print setting screen extension unit 205 calculates an estimated time taken to complete printing on the basis of the attribute information acquired in S1802 (S1803). Subsequently, the print setting screen extension unit 205 generates screen definition information including the estimated time taken to complete printing calculated in S1803 (S1804), and notifies the print support system 211 of the generated screen definition information (S1805). After that, the print support system 211 adds a display item to the print setting screen of the OS in accordance with the screen definition information notified by the print setting screen extension unit 205. A specific example of the screen definition information generated in S1804 is exemplified in FIG. 19.

FIG. 19 is a diagram illustrating a specific example of the screen definition information generated by the print setting screen extension unit 205 in S1804. The "display" tag includes items to be displayed on the print setting screen of the OS by the print support system 211. In the "text" tag, the "description" tag contains a character string representing the estimated time taken to complete printing calculated in S1803 by the print setting screen extension unit 205.

Figure 20:
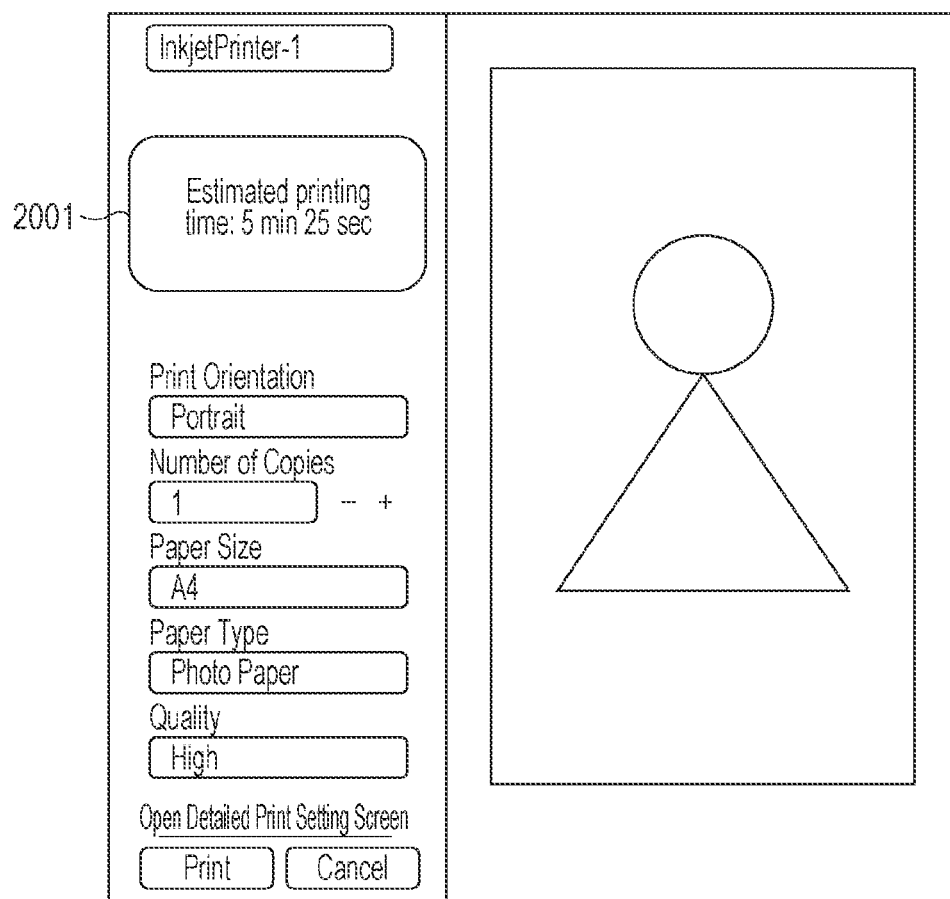
FIG. 20 is a view illustrating an example of a print setting screen.

FIG. 20 is a view illustrating a display example of a print setting screen of the OS that is displayed in accordance with the screen definition information illustrated in FIG. 19. An area 2001 is an area for displaying items indicated by the screen definition information notified by the print setting screen extension unit 205. In the area 2001, the estimated time taken to complete printing, which is included in the screen definition information illustrated in FIG. 19, is represented.

According to the present embodiment, the print data editing unit 208 can estimate the time taken to complete printing on the basis of attribute information of print data and display the estimated time taken to complete printing on the print setting screen of the OS. This allows the user to predict the time taken to complete printing before executing printing. The time taken to complete printing may be estimated from the attribute information of the print data and other information (such as the number of physical sheets of paper to be used for printing) based on each print setting selected by the user.

Seventh Embodiment

The present embodiment describes a configuration for displaying a guide to execution of initial setting processing for the printer 102 on the basis of the information acquired from the printer 102 in the display item determination process of the print setting screen extension unit 205. The basic hardware configuration and software configuration are similar to those in the example described in the first embodiment, and a description thereof will thus be omitted.

Figure 21:
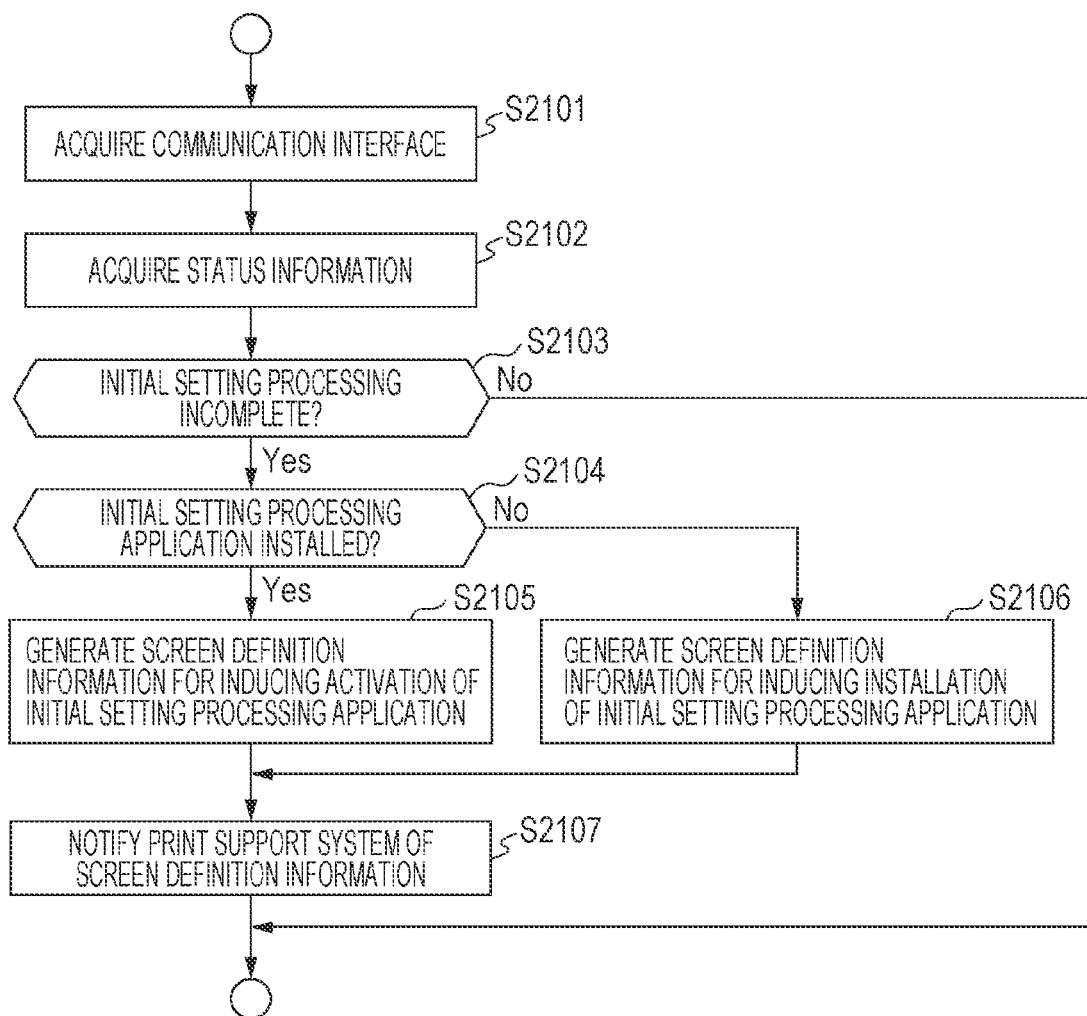
FIG. 21 is a flowchart illustrating an example of the display item determination process of the print setting screen extension unit.

FIG. 21 is a diagram illustrating details of the display item determination process (S307 and S308) of the print setting screen extension unit 205 in the present embodiment. First, the print setting screen extension unit 205 acquires a communication interface provided from the OS (S2101). Subsequently, the print setting screen extension unit 205 acquires status information from the printer 102 through the communication interface (S2102). In S2102, the print setting screen extension unit 205 acquires information on whether the initial setting processing (such as removal of the packaging material or attachment of ink cartridges) for the printer 102 is completed. After that, the print setting screen extension unit 205 determines whether the initial setting processing for the printer 102 is incomplete on the basis of the information acquired in S2102 (S2103). If Yes is determined in S2103, the print setting screen extension unit 205 determines whether an application for providing guidance for the initial setting processing for the printer 102 has been installed in the information processing apparatus (S2104). The application is hereinafter referred to as an initial setting processing application. If Yes is determined in S2104, then, the print setting screen extension unit 205 generates screen definition information for inducing the activation of the initial setting processing application (S2105). On the other hand, if No is determined in S2104, the print setting screen extension unit 205 generates screen definition information for inducing installation of the initial setting processing application (S2106). After that, the print setting screen extension unit 205 notifies the print support system 211 of the screen definition information generated in S2105 or S2106 (S2107). If No is determined in S2103, the print setting screen extension unit 205 skips the processing of S2104 to S2107. A specific example of the pieces of screen definition information generated in S2105 and S2106 is exemplified in FIGS. 22A and 22B.

FIGS. 22A and 22B illustrate a specific example of the pieces of screen definition information generated by the print setting screen extension unit 205 in S2105 and S2106, respectively. In FIG. 22A, in the "text" tag, the "description" tag describes incomplete initial setting processing for the printer 102 and a guide to execution of initial setting processing. The "button" tag defines the configuration of a button to be displayed on the print setting screen of the OS. The "title" tag represents the button name, and the "url" tag describes information on the initial setting processing application to be activated when the button is pressed. In FIG. 22B, in the "text" tag, the "description" tag describes incomplete initial setting processing for the printer 102 and a guide to installation of the initial setting processing application and execution of initial setting processing. The "button" tag defines the configuration of a button to be displayed on the print setting screen of the OS. The "title" tag represents the button name, and the "url" tag describes a link to a website from which the initial setting processing application to be displayed when the button is pressed is distributed.

Figure 23:
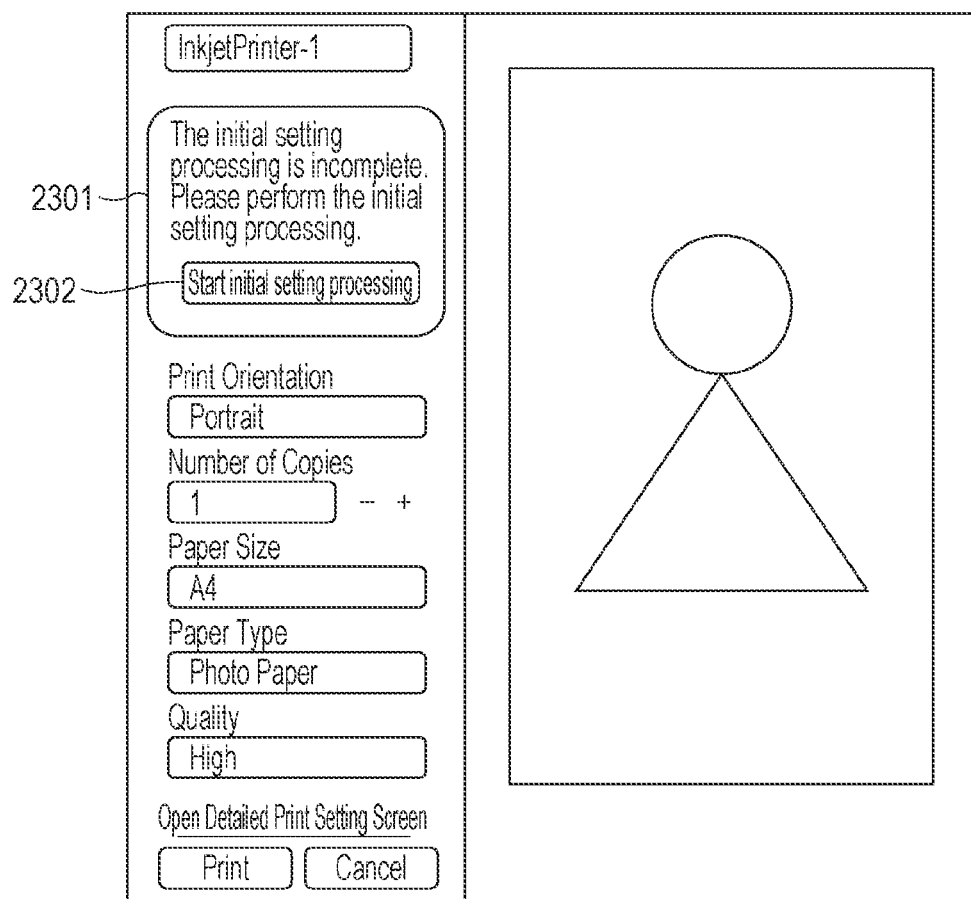
FIG. 23 is a view illustrating a display example of a print setting screen of an OS that is displayed in accordance with screen definition information.

FIG. 23 is a view illustrating a display example of a print setting screen of the OS that is displayed in accordance with the screen definition information illustrated in FIG. 22A. An area 2301 is an area for displaying items indicated by the screen definition information notified by the print setting screen extension unit 205. The area 2301 displays text for guiding execution of the initial setting processing, which is included in the screen definition information in FIG. 22A, and a button (button 2302) for starting the initial setting processing. The button 2302 is pressed to activate the initial setting processing application indicated by the "url" tag in FIG. 22A. When the screen definition information illustrated in FIG. 22B is applied, the button 2302 is pressed to display the website from which the initial setting processing application is distributed, which is indicated by the "url" tag in FIG. 22B, on the web browser.

According to the present embodiment, a guide to execution of initial setting processing for the printer 102 can be represented on the print setting screen of the OS on the basis of the information acquired from the printer 102 in the display item determination process of the print setting screen extension unit 205. This allows the user to recognize that the initial setting processing for the printer 102 is incomplete before executing printing.

Other Embodiments

The present disclosure may also be implemented by processing in which a program for implementing one or more functions of the embodiments described above is supplied to a system or an apparatus via a network or a storage medium and one or more processors in a computer of the system or the apparatus read and execute the program. The present disclosure may also be implemented by circuitry (e.g., an application specific integrated circuit (ASIC)) that implements the one or more functions.

In some embodiments of the present disclosure, the user can check desired information without explicitly giving instructions to display a screen of an extension application.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2022-118396, filed Jul. 26, 2022, which is hereby incorporated by reference herein in its entirety.

What is claimed is:

1. An information processing apparatus comprising:
an operating system;
print data generation software available on a plurality of different printers; and
an application program configured to cooperate with the print data generation software,
the application program causing the information processing apparatus to:
acquire status information from a printer among the plurality of printers, the printer performing printing using a consumable item,
generate screen definition information based on the status information acquired from the printer,
wherein, in a case where the acquired status information indicates that a remaining level of the consumable item of the printer is low, the screen definition information is remaining ink level screen definition information, and
wherein, in a case where the acquired status information does not indicate that the remaining level of the consumable item of the printer is low, and in a case where the error that prevents printing has not occurred in the printer, the screen definition information is operation manual screen definition information describing an operation method of the printer, and
notify the operating system of the screen definition information in order to cause a display of the information processing apparatus to display a print setting screen provided by the operating system,
wherein the print setting screen includes at least one print setting item and information based on the notified screen definition information, and
wherein, in a case where the acquired status information indicates that a remaining level of the consumable item of the printer is low, the operating system displays on the print setting screen, information indicating that the remaining level is low and displays a button for displaying the website for purchase of ink cartridges.

2. The information processing apparatus according to claim 1, wherein the information to be displayed on the print setting screen of the operating system of the information processing apparatus comprises information on a consumable item of the printer.

3. The information processing apparatus according to claim 1, wherein in response to acquiring status information indicating that a remaining level of the consumable item of the printer is low, the determined information indicates that the remaining level of the consumable item of the printer is low is information to be displayed on the print setting screen of the operating system of the information processing apparatus, and the operating system of the information processing apparatus is notified of screen definition information defining the information indicating that the remaining level of the consumable item of the printer is low.

4. The information processing apparatus according to claim 1, wherein the information determined to be displayed on the print setting screen of the operating system of the information processing apparatus comprises information on an error in the printer.

5. The information processing apparatus according to claim 1, wherein in response to acquiring status information indicating that the printer has an error, the determined information indicates that the printer has an error is information to be displayed on the print setting screen of the operating system of the information processing apparatus, and the operating system of the information processing apparatus of screen definition information defining the information indicating that the printer has an error.

6. A non-transitory computer-readable storage medium storing a program executable by a computer of an information processing apparatus and cooperating with print data generation software available on a plurality of different printers, the program causing the computer to execute processing comprising:
acquiring status information from a printer among the plurality of printers, the printer performing printing using a consumable item;
generating screen definition information based on the status information acquired from the printer,
wherein, in a case where the acquired status information indicates that a remaining level of the consumable item of the printer is low, the screen definition information is remaining ink level screen definition information,
wherein, in a case where the acquired status information does not indicate that the remaining level of the consumable item of the printer is low, and in a case where an error that prevents printing has occurred in the printer, the screen definition information is error screen definition information including information on the error that has occurred, and
wherein, in a case where the acquired status information does not indicate that the remaining level of the consumable item of the printer is low, and in a case where the error that prevents printing has not occurred in the printer, the screen definition information is operation manual screen definition information describing an operation method of the printer; and
notifying an operating system of the information processing apparatus of the screen definition information in order to cause a display of the information processing apparatus to display a print setting screen provided by the operating system,
wherein the print setting screen includes at least one print setting item and information based on the notified screen definition information, and
wherein, in a case where the acquired status information indicates that a remaining level of the consumable item of the printer is low, the operating system displays-on the print setting screen, information indicating that the remaining level is low and displays a button for displaying the website for purchase of ink cartridges.

7. The non-transitory computer-readable storage medium according to claim 6, wherein the information to be displayed on the print setting screen of the operating system of the information processing apparatus comprises information on a consumable item of the printer.

8. The non-transitory computer-readable storage medium according to claim 6, wherein in response to acquisition of status information indicating that a remaining level of the consumable item of the printer is low, the determined information indicates that the remaining level of the consumable item of the printer is low is information to be displayed on the print setting screen of the operating system of the information processing apparatus, and the operating system of the information processing apparatus is notified of screen definition information defining the information indicating that the remaining level of the consumable item of the printer is low.

9. The non-transitory computer-readable storage medium according to claim 6, wherein the information determined to be displayed on the print setting screen of the operating system of the information processing apparatus comprises information on an error in the printer.

10. The non-transitory computer-readable storage medium according to claim 6, wherein in response to acquisition of status information indicating that the printer has an error, the determined information indicates that the printer has an error is information to be displayed on the print setting screen of the operating system of the information processing apparatus, and the operating system of the information processing apparatus is notified of screen definition information defining the information indicating that the printer has an error.

\* \* \* \* \*